(12) United States Patent
Futa et al.

(10) Patent No.: US 7,936,874 B2
(45) Date of Patent: May 3, 2011

(54) INFORMATION TRANSFER SYSTEM, ENCRYPTION DEVICE, AND DECRYPTION DEVICE

(75) Inventors: Yuichi Futa, Osaka (JP); Motoji Ohmori, Hirakata (JP)

(73) Assignee: Panasonic Corporation, Osaka (JP)

( * ) Notice: Subject to any disclaimer, the term of this patent is extended or adjusted under 35 U.S.C. 154(b) by 1247 days.

(21) Appl. No.: 10/572,457

(22) PCT Filed: Oct. 1, 2004

(86) PCT No.: PCT/JP2004/014887
§ 371 (c)(1),
(2), (4) Date: Mar. 20, 2006

(87) PCT Pub. No.: WO2005/034421
PCT Pub. Date: Apr. 14, 2005

(65) Prior Publication Data
US 2007/0121933 A1    May 31, 2007

(30) Foreign Application Priority Data

Oct. 3, 2003  (JP) ................................ 2003-346172
Dec. 18, 2003  (JP) ................................ 2003-421116

(51) Int. Cl.
*G09C 1/10* (2006.01)
(52) U.S. Cl. .............. 380/42; 380/28; 380/30; 708/490; 708/492
(58) Field of Classification Search ........... 380/28, 380/30, 42; 708/490, 492
See application file for complete search history.

(56) References Cited

U.S. PATENT DOCUMENTS

| 6,199,086 | B1* | 3/2001 | Dworkin et al. ............. 708/492 |
| 6,480,606 | B1* | 11/2002 | Kurumatani .................. 380/30 |
| 6,611,597 | B1* | 8/2003 | Futa et al. .................... 380/30 |
| 6,618,483 | B1* | 9/2003 | Vanstone et al. ............. 380/30 |
| 6,910,058 | B2* | 6/2005 | Futa et al. .................... 380/28 |
| 2002/0099663 | A1* | 7/2002 | Yoshino et al. ................ 705/65 |

FOREIGN PATENT DOCUMENTS

DE  101 61 137 A1  10/2003
JP  2002-141895  5/2002

OTHER PUBLICATIONS

Michael Rosing, "Implementing Elliptic curve Cryptography", Manning, 1998, pp. 180-181.
Neal Koblitz, "A Course in Number Theory and Cryptography", Springer-Verlag, 1987, pp. 162-163.
Sasaki et al., "Information System Security: Secureplaza and Secure System Solution, Advancing Information System Security Technologies and Hitachi's Approach," Hitachi Review, Japan, Hitachi, Ltd., Jun. 1, 1999, vol. 81, No. 6, pp. 4-8 (with partial English translation).

* cited by examiner

*Primary Examiner* — Brandon S Hoffman
*Assistant Examiner* — Kevin Richards
(74) *Attorney, Agent, or Firm* — Wenderoth, Lind & Ponack, L.L.P.

(57) ABSTRACT

A content delivery system, enabling a ciphertext to be reduced in size when using the ElGamal cipher, includes a content delivery device performing elliptic curve encryption on a content key, generating an encrypted content key that includes an x coordinate of an elliptic curve point obtained by the elliptic curve encryption, and outputting the encrypted content key. Further, the content delivery system includes content reception device receiving the encrypted content key, calculating a y coordinate of the elliptic curve point using the x coordinate included in the encrypted content key, and performing elliptic curve decryption using the elliptic curve point and other information included in the encrypted content key, to generate a decrypted content key.

11 Claims, 16 Drawing Sheets

INFORMATION TRANSFER SYSTEM, ENCRYPTION DEVICE, AND DECRYPTION DEVICE

FIELD OF INVENTION

The present invention relates to secret information transfer techniques that use cryptography for information security.

DESCRIPTION OF THE RELATED ART

In recent years, cryptography is employed in a variety of fields, to conduct communication securely without the communicated content being revealed to third parties.

For example, when delivering a storage medium, e.g. a DVD, on which content such as music or movies is recorded or transmitting the content via a network to many users, the content is encrypted so as to prevent unauthorized use.

There are mainly two types of cryptography: secret key cryptography; and public key cryptography. In secret key cryptography, the same key is used for encryption and decryption. Therefore, it is necessary for a sender (that performs encryption) and a receiver (that performs decryption) to share the key beforehand. In public key cryptography, meanwhile, different keys are used for encryption and decryption, with the decryption key being kept secret and the encryption key being made public.

DES (Data Encryption Standard) is one type of secret key cryptography. DES is a block cipher that uses a plaintext, a ciphertext, and a key which are each 64 bits long. In DES, a plaintext block is first subjected to an initial permutation which changes the order of bits in such a way that adjacent bits are separated by approximately 32 bits. The permuted block is then subjected to 16 identical stages of conversion.

Elliptic curve ElGamal is one type of public key cryptography. Elliptic curve ElGamal is constructed by applying a multiplication operation of an ElGamal cipher on a finite field to an addition operation on an elliptic curve.

Elliptic curve ElGamal is the following.

A receiver (that performs decryption) holds secret key ks of elliptic curve ElGamal, in secrecy.

A sender (that performs encryption) holds public key KP corresponding to secret key ks:

$$KP=ks*G$$

where G is a base point on an elliptic curve in elliptic curve ElGamal, and ks*G is a point on the elliptic curve obtained by adding G to itself (ks−1) times.

This being so, the sender generates ciphertext EKC from plaintext KC in the following manner.

(Step 1) Generate random number k, and calculate PC=k*G.

(Step 2) Calculate k*KP.

(Step 3) Convert plaintext KC to point P_KC=f(KC) on the elliptic curve. Conversion function f used here is explained later.

(Step 4) Calculate C=P_KC+k*KP.

(Step 5) Send PC and C as ciphertext EKC.

The receiver generates decrypted text KC' from ciphertext EKC in the following manner.

(Step 1) Calculate ks*PC, using PC included in ciphertext EKC.

(Step 2) Calculate P_KC'=C−ks*PC, and convert P_KC' to an integer to thereby obtain decrypted text KC'=f⁻¹(P_KC'). Here, f⁻¹ is an inverse of conversion function f. Decrypted text KC' is expected to be equal to plaintext KC, for the following reason.

Since $$ks*PC=ks*k*G=k*KP$$

holds true, $$\begin{aligned} P\_KC' &= C - ks*PC \\ &= P\_KC + k*KP - ks*PC \\ &= P\_KC \end{aligned}$$

Thus, point P_KC' is equal to point P_KC. Accordingly, KC' is equal to KC.

Conversion function f converts an integer having a smaller bit size than a field of definition of the elliptic curve, to a corresponding point on the elliptic curve. Inverse conversion function f⁻¹, meanwhile, converts a point on the elliptic curve to a corresponding integer having a smaller bit size than the field of definition. Conversion function f is an injection. Any function can be used so long as f⁻¹(f(v))=v where v is an integer. Conversion functions are described in detail in Neal Koblitz *A Course in Number Theory and Cryptography*, Springer-Verlag, 1987, pp. 162-163.

The following examines the data size of the ciphertext in the above elliptic curve ElGamal cipher.

For simplicity's sake, let the field of definition of the elliptic curve be 160 bits which is a currently recommended parameter in elliptic curve cryptography.

Ciphertext EKC is composed of points C and PC. Points C and PC are each made up of x and y coordinates. Accordingly, points C and PC are each 320 bits long. Therefore, ciphertext EKC is 320+320=640 bits (=80 bytes).

While DES generates a ciphertext which is equal in size to a plaintext, elliptic curve ElGamal generates a ciphertext which is four times as large as a plaintext.

Thus, when compared with other ciphers such as DES, elliptic curve ElGamal achieves a higher level of security but has the problem that the ciphertext length is larger when the key length is equal.

Note that the conventional techniques are described in: T. Okamoto & H. Yamamoto *Modern Encryption*, Sangyo Tosho, 1997; Henri Cohen *A Course in Computational Algebraic Number Theory* (Graduate Texts in Mathematics, Vol 138), Springer-Verlag, 1993, pp. 31-33; Michael Rosing *Implementing Elliptic Curve Cryptography*, Manning, 1998, pp. 180-181; Neal Koblitz *A Course in Number Theory and Cryptography*, Springer-Verlag, 1987, pp. 162-163; and U.S. Pat. No. 6,199,086.

BRIEF SUMMARY OF THE INVENTION

The present invention aims to provide an information transfer system, an encryption device, a decryption device, an encryption method, a decryption method, and a computer-readable program which enable a ciphertext to be reduced in length when elliptic curve cryptography is used.

The stated aim can be achieved by an information transfer system for transferring information in secrecy using an elliptic curve discrete logarithm problem as a basis for security, the information transfer system including an encryption device and a decryption device, the encryption device including: a storage unit storing a plaintext; an encryption unit operable to perform elliptic curve encryption on the plaintext, and generate a ciphertext that includes an x coordinate of an encryption point on an elliptic curve, the encryption point being generated by the elliptic curve encryption; and an output unit operable to output the ciphertext, and the decryption device including: an acquisition unit operable to acquire the ciphertext; and a decryption unit operable to calculate a y coordinate of the encryption point on the elliptic curve using the x coordinate included in the acquired ciphertext, and perform elliptic curve decryption using the encryption point and other information included in the acquired ciphertext to generate a decrypted text.

According to this construction, the encryption device outputs ciphertext which includes an x coordinate of an elliptic curve point but does not include a y coordinate of the elliptic curve point. The decryption device calculates the y coordinate of the elliptic curve point from the x coordinate included in the received ciphertext, and performs decryption using the calculated elliptic curve point. In this way, the data size of the transferred ciphertext can be reduced.

Here, the plaintext stored in the storage unit in the encryption device may be a scalar, wherein the encryption unit includes: a random number generation unit operable to generate a random number which is a scalar; a first calculation unit operable to multiply a base point on the elliptic curve by the random number; a second calculation unit operable to multiply a public key point on the elliptic curve by the random number; a conversion unit operable to apply a conversion function for converting a scalar to a corresponding point on the elliptic curve, to the plaintext to generate a plaintext point on the elliptic curve; a third calculation unit operable to calculate a sum point, using addition of the plaintext point and the multiplied public key point; and a generation unit operable to generate the ciphertext that includes the sum point and an x coordinate of the multiplied base point which is the encryption point.

Here, the third calculation unit may judge whether a predetermined condition is satisfied, and set, as the sum point, a sum of the plaintext point and the multiplied public key point if the judgment is affirmative, and a corresponding negative point of the sum of the plaintext point and the multiplied public key point if the judgment is negative.

Here, the elliptic curve may be defined over a finite field GF(p) by an equation $$y^2 = x^3 + a \times x + b$$

where p is a prime, wherein the third calculation unit judges, as the predetermined condition, whether a y coordinate of the multiplied base point is smaller than (p−1)/2.

Here, the acquisition unit in the decryption device may acquire the ciphertext from the above encryption device, wherein the decryption unit includes: a square root calculation unit operable to substitute the x coordinate included in the acquired ciphertext into the equation $y^2 = x^3 + a \times x + b$ to find two solutions y, select one of the two solutions y that is smaller than (p−1)/2, and generate a first decryption point which is made up of the x coordinate included in the acquired ciphertext and the selected solution y as a y coordinate; a scalar multiplication unit operable to multiply the first decryption point by a secret key which is a scalar to generate a second decryption point, the public key point having been generated by multiplying the base point on the elliptic curve by the secret key; and a decrypted text calculation unit operable to subtract the second decryption point from the sum point included in the acquired ciphertext, and apply an inverse conversion function for converting a point on the elliptic curve to a corresponding scalar, to a point obtained as a result of the subtraction to generate the decrypted text.

According to these constructions, the present invention can be applied to an elliptic curve on GF(p).

Here, the plaintext stored in the storage unit in the encryption device may be a scalar, wherein the encryption unit includes: a random number generation unit operable to generate a random number which is a scalar; a first calculation unit operable to multiply a base point on the elliptic curve by the random number; a second calculation unit operable to multiply a public key point on the elliptic curve by the random number; a conversion unit operable to apply a conversion function for converting a scalar to a corresponding point on the elliptic curve, to the plaintext to generate a plaintext point on the elliptic curve; a third calculation unit operable to calculate a sum point, using addition of the plaintext point and the multiplied public key point; and a generation unit operable to generate the ciphertext that includes the sum point and an x coordinate of the multiplied base point which is the encryption point.

Here, the third calculation unit may judge whether a predetermined condition is satisfied, and set, as the sum point, a sum of the plaintext point and the multiplied public key point if the judgment is affirmative, and a corresponding negative point of the sum of the plaintext point and the multiplied public key point if the judgment is negative.

Here, the elliptic curve may be defined over a finite field $GF(2^m)$ by an equation $$y^2 + xy = x^3 + ax^2 + b$$

where m is a natural number, with a generator polynomial in $GF(2^m)$ being denoted by f(x) whose root is α, wherein the third calculation unit judges, as the predetermined condition, whether a coefficient of a term $α^s$ in the generator polynomial of a y coordinate of the multiplied base point by α is equal to a coefficient of a term $α^s$ in the generator polynomial of the x coordinate of the multiplied base point by α, where s denotes a lowest degree among terms with nonzero coefficients in the generator polynomial of the x coordinate of the multiplied base point by α.

Here, the acquisition unit in the decryption device may acquire the ciphertext from the above encryption device, wherein the decryption unit includes: a detection unit operable to detect s which is a lowest degree among terms with nonzero coefficients in the generator polynomial of the x coordinate included in the acquired ciphertext by α; a solution unit operable to substitute the x coordinate included in the acquired ciphertext into the equation $y^2 + xy = x^3 + ax^2 + b$ to find two solutions y, select, out of the two solutions y, a solution y whose generator polynomial by α includes a term $α^s$ that has an equal coefficient to a term $α^s$ in the generator polynomial of the x coordinate included in the acquired ciphertext by α, and generate a first decryption point which is made up of the x coordinate included in the acquired ciphertext and the selected solution y as a y coordinate; a scalar multiplication unit operable to multiply the first decryption point by a secret key which is a scalar to generate a second decryption point, the public key point having been generated by multiplying the base point on the elliptic curve by the secret key; and a decrypted text calculation unit operable to subtract the second decryption point from the sum point included in the acquired ciphertext, and apply an inverse conversion function for converting a point on the elliptic curve to a corresponding scalar, to a point obtained as a result of the subtraction to generate the decrypted text.

According to these constructions, the present invention can be applied to an elliptic curve on $GF(2^m)$.

Here, the elliptic curve may be defined over a finite field GF(p) by an equation $$y^2 = x^3 + a \times x + b$$

where p is a prime, wherein the plaintext stored in the storage unit in the encryption device is a scalar, and the encryption unit includes: a random number generation unit operable to generate a random number which is a scalar; a second calculation unit operable to multiply a public key point on the elliptic curve by the random number; a conversion unit operable to apply a conversion function for converting a scalar to a corresponding point on the elliptic curve, to the plaintext to generate a plaintext point on the elliptic curve; a third calculation unit operable to add the plaintext point and the multiplied public key point to obtain a sum point; a first calculation unit operable to judge whether a y coordinate of the sum point is smaller than $(p-1)/2$, and multiply a base point on the elliptic curve by the random number if the judgment is affirmative, and multiply the base point on the elliptic curve by a corresponding negative number of the random number if the judgment is negative; and a generation unit operable to generate the ciphertext that includes the multiplied base point and an x coordinate of the sum point which is the encryption point.

Here, the acquisition unit in the decryption device may acquire the ciphertext from the above encryption device, wherein the decryption unit includes: a square root calculation unit operable to substitute the x coordinate included in the acquired ciphertext into the equation $y^2=x^3+a \times x+b$ to find two solutions y, select one of the two solutions y that is smaller than $(p-1)/2$, and generate a first decryption point which is made up of the x coordinate included in the acquired ciphertext and the selected solution y as a y coordinate; a scalar multiplication unit operable to multiply the multiplied base point included in the acquired ciphertext by a secret key which is a scalar to generate a second decryption point, the public key point having been generated by multiplying the base point on the elliptic curve by the secret key; and a decrypted text calculation unit operable to subtract the second decryption point from the first decryption point, and apply an inverse conversion function for converting a point on the elliptic curve to a corresponding scalar, to a point obtained as a result of the subtraction to generate the decrypted text.

According to these constructions, the present invention can be applied to an elliptic curve on GF(p).

Here, the elliptic curve may be defined over a finite field GF(p) by an equation $$y^2=x^3+a \times x+b$$

where p is a prime, wherein the plaintext stored in the storage unit in the encryption device is a scalar, and the encryption unit includes: a random number generation unit operable to generate a random number which is a scalar; a first calculation unit operable to multiply a base point on the elliptic curve by the random number; a second calculation unit operable to multiply a public key point on the elliptic curve by the random number; a third calculation unit operable to perform an exclusive-OR operation on the plaintext and an x coordinate of the multiplied public key point; and a generation unit operable to generate the ciphertext that includes an exclusive-OR value obtained as a result of the exclusive-OR operation and an x coordinate of the multiplied base point which is the encryption point.

Here, the acquisition unit in the decryption device may acquire the ciphertext from the above encryption device, wherein the decryption unit includes: a square root calculation unit operable to substitute the x coordinate included in the acquired ciphertext into the equation $y^2=x^3+a \times x+b$ to find two solutions y, select one of the two solutions y that is smaller than $(p-1)/2$, and generate a first decryption point which is made up of the x coordinate included in the acquired ciphertext and the selected solution y as a y coordinate; a scalar multiplication unit operable to multiply the first decryption point by a secret key which is a scalar to generate a second decryption point, the public key point having been generated by multiplying the base point on the elliptic curve by the secret key; and a decrypted text calculation unit operable to perform an exclusive-OR operation on the exclusive-OR value included in the acquired ciphertext and an x coordinate of the second decryption point, to generate the decrypted text.

According to these constructions, the data size of the transferred ciphertext can further be reduced.

Here, the plaintext stored in the storage unit in the encryption device may be a content key, wherein the encryption unit generates the ciphertext by encrypting the content key, and the encryption device further includes: a content encryption unit operable to encrypt content using the content key; and a content output unit operable to output the encrypted content.

Here, the acquisition unit in the decryption device may acquire the ciphertext and the encrypted content from the above encryption device, wherein the decryption unit decrypts the ciphertext to generate the decrypted text which is a decrypted content key, and the decryption device further includes: a content decryption unit operable to decrypt the encrypted content using the decrypted content key to generate decrypted content; and content playback unit operable to play back the decrypted content.

According to these constructions, when encrypting content using a content key and decrypting the encrypted content using the content key, the data size of an encrypted content key as a transferred ciphertext can be reduced.

Thus, the data size of the transferred ciphertext can be reduced by omitting the y coordinate of the elliptic curve point from the ciphertext, which contributes to high practicality.

DETAILED DESCRIPTION OF THE INVENTION

1. First Embodiment

The following describes a content delivery system 10 to which the first embodiment of the present invention relates.
1.1. Construction of the Content Delivery System 10

Figure 1:
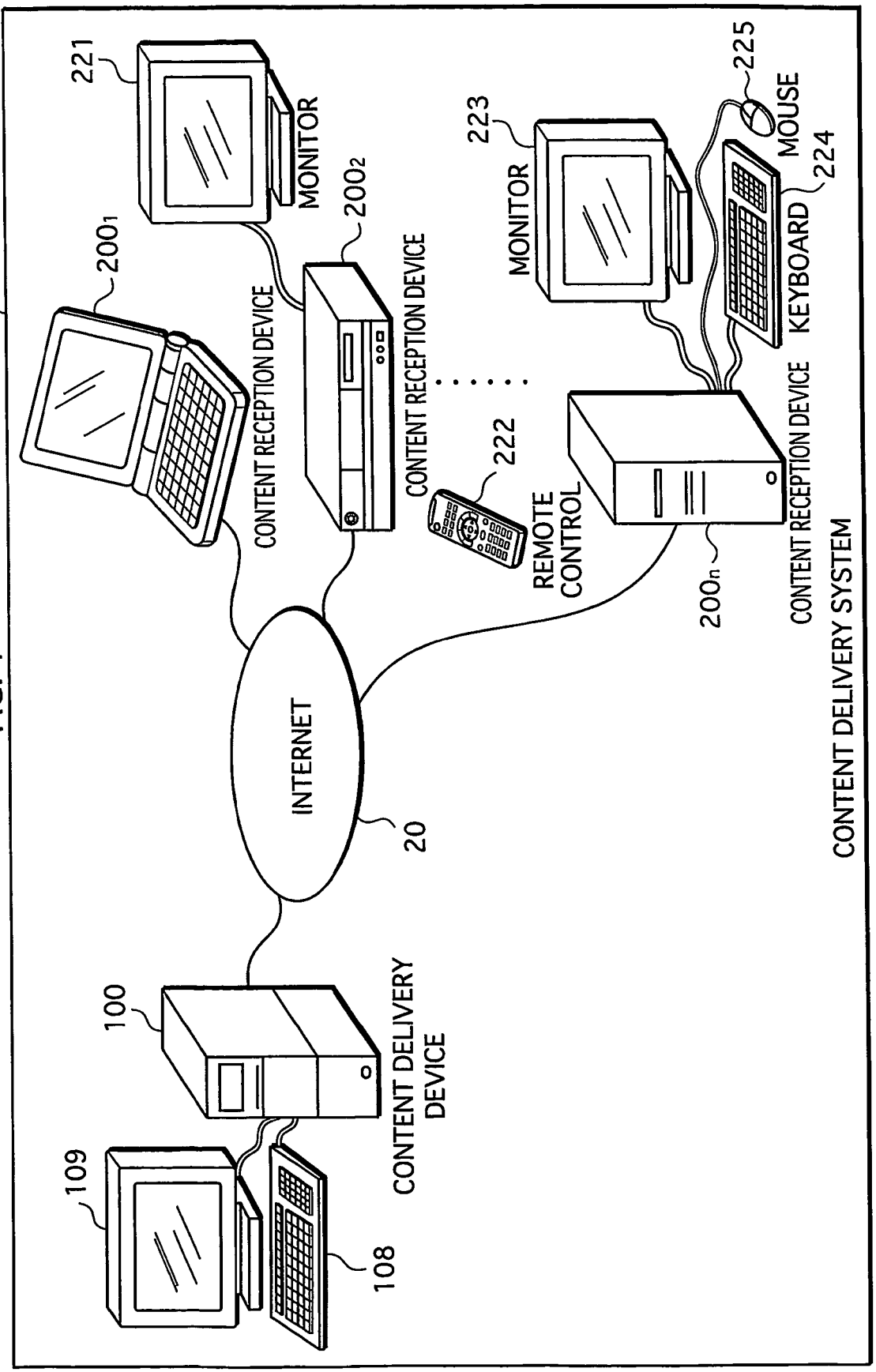
FIG. 1 shows a construction of a content delivery system to which the first embodiment of the present invention relates.

FIG. 1 shows a construction of the content delivery system 10. As shown in the drawing, the content delivery system 10 is roughly made up of one content delivery device 100 and n content reception devices $200_1$, $200_2$, ... $200_i$, ..., $200_n$. Here, n is a natural number. For example, when n=1,000,000, the content delivery system 10 includes 1,000,000 content reception devices. The content delivery device 100 is connected to the content reception devices $200_1$, $200_2$, ... $200_n$ via the Internet 20.

The content delivery device 100 generates content key KC for content C which is a digital work of a movie or the like, and encrypts content C using content key KC according to encryption algorithm $Enc_1$ of a secret key cipher to generate encrypted content EC. The content delivery device 100 also encrypts content key KC according to encryption algorithm $Enc_2$ of a public key cipher to generate encrypted content key information EKC, and transmits encrypted content EC and encrypted content key information EKC to each of the content reception devices $200_1$, $200_2$, ..., $200_n$ via the Internet 20.

The content reception device $200_1$ receives encrypted content EC and encrypted content key information EKC from the content delivery device 100 via the Internet 20, and decrypts encrypted content key information EKC according to decryption algorithm $Dec_2$ of the public key cipher to generate decrypted content key KC'. The content reception device $200_1$ then decrypts encrypted content EC using decrypted content key KC' according to decryption algorithm $Dec_1$ of the secret key cipher to generate decrypted content C', and plays back decrypted content C'. The other content reception devices $200_2$, ..., $200_n$ are the same as the content reception device $200_1$.

Here, decryption algorithm $Dec_1$ is an algorithm for decrypting a ciphertext that is generated according to encryption algorithm $Enc_1$, and decryption algorithm $Dec_2$ is an algorithm for decrypting a ciphertext that is generated according to encryption algorithm $Enc_2$.

It should be noted that a subscript of a reference sign given to each of the content reception devices $200_1$, $200_2$, ..., $200_n$ is a device ID number that uniquely identifies the content reception device. For instance, the content reception device $200_i$ is uniquely identified by the device ID number "i".
1.2. Elliptic Curve Cryptography and Elliptic Curve Parameters In the content delivery system 10, elliptic curve cryptography is used as the above public key cipher. Elliptic curve cryptography is described in detail in T. Okamoto & H. Yamamoto *Modern Encryption*, Sangyo Tosho, 1997. The following briefly explains parameters of elliptic curve $E_1$ that is used in the content delivery system 10.

Let elliptic curve $E_1$ be defined by an equation of the form $$y^2 = x^3 + a \times x + b,$$

where x and y are variables and a and b are constants. Also, a×x denotes multiplication of a and x. Constants a and b are natural numbers. Single elliptic curve $E_1$ is determined by these constants a and b. In general, elliptic curve $E_1$ is defined on field of definition $GF(p^m)$ which is a finite field, where p is a prime and m is a natural number. Let m=1 so that the field of definition of elliptic curve $E_1$ is GF(p), for simplicity's sake.
1.3. Elliptic Curve Discrete Logarithm Problem A discrete logarithm problem is used as a basis for the security of public key cryptography. Representative examples of the discrete logarithm problem are a problem defined on a finite field and a problem defined on an elliptic curve. The discrete logarithm problem is described in detail in Neal Koblitz *A Course in Number Theory and Cryptography*, Springer-Verlag, 1987.

The elliptic curve discrete logarithm problem is the following.

Let E(GF(p)) be an elliptic curve defined over finite field GF(p), with point G on elliptic curve E, given when the order of E is divisible by a large prime, being set as a base point. This being so, the problem is to find integer x such that $$Y = x * G,$$

where Y is a given point on E, if such integer x exists.

The reason the discrete logarithm problem assists in the security of public key cryptography is that the above computation of x is extremely difficult for finite field GF(p) having a large number of elements.
1.4. Construction of the Content Delivery Device 100

Figure 2:
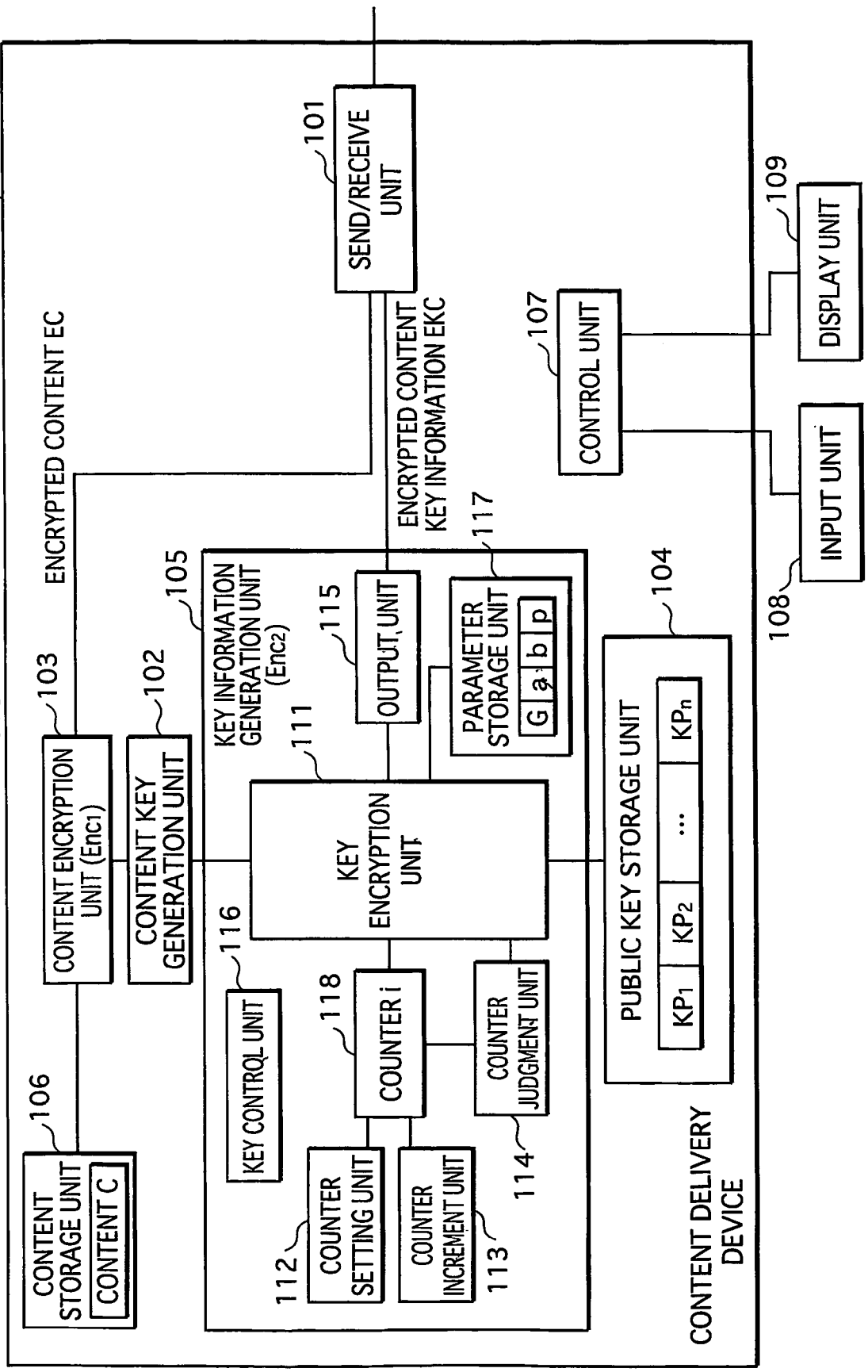
FIG. 2 is a block diagram showing a construction of a content delivery device shown in FIG. 1.

FIG. 2 is a block diagram showing a construction of the content delivery device 100. In the drawing, the content delivery device 100 includes a send/receive unit 101, a content key generation unit 102, a content encryption unit 103, a public key storage unit 104, a key information generation unit 105, a content storage unit 106, and a control unit 107. The control unit 107 is connected to an input unit 108 and a display unit 109.

The content delivery device 100 is actually realized by a computer system that includes a microprocessor, a ROM, a RAM, a hard disk unit, and a communication unit. A computer-readable program is stored in the RAM or the hard disk unit. Functions of the content delivery device 100 are realized by the microprocessor operating according to this computer-readable program.

(1) Public Key Storage Unit 104

The public key storage unit 104 stores public keys $KP_1$, $KP_2$, ..., $KP_n$ of the content reception devices $200_1$, $200_2$, ... $200_n$ respectively, in advance.

Public keys $KP_1, KP_2, \ldots, KP_n$ are each a point on elliptic curve $E_1$ calculated as follows:

$$KP_1 = ks_1 * G;$$

$$KP_2 = ks_2 * G; \text{ and}$$

$$\vdots$$

$$KP_n = ks_n * G,$$

where $ks_1, ks_2, \ldots, ks_n$ are secret keys of the content reception devices $200_1, 200_2, \ldots, 200_n$ respectively, and G is a base point on elliptic curve $E_1$ in elliptic curve ElGamal. In this specification, a*B denotes a point on an elliptic curve obtained by adding point B on the elliptic curve to itself (a−1) times. For instance, $ks_1*G$ is a point on elliptic curve $E_1$ obtained by adding base point G to itself ($ks_1$−1) times. This operation is hereafter called elliptic curve point multiplication (which can also be called elliptic curve exponentiation/scalar multiplication).

(2) Content Storage Unit 106

The content storage unit 106 stores content C which is a digital work of a movie or the like, in advance. Content C is generated by compressing video data and audio data of the digital work according to the MPEG2 (Moving Picture Experts Group 2) standards that define video and audio compression/coding techniques.

(3) Content Key Generation Unit 102

The content key generation unit 102 generates a 160-bit random number for content C stored in the content storage unit 106, and sets the generated random number as content key KC. The content key generation unit 102 outputs content key KC to the content encryption unit 103 and the key information generation unit 105.

(4) Content Encryption Unit 103

The content encryption unit 103 reads content C from the content storage unit 106, and receives content key KC from the content key generation unit 102.

The content encryption unit 103 encrypts content C using content key KC according to encryption algorithm $Enc_1$ of the secret key cipher, to generate encrypted content $$EC = Enc_1(KC, C).$$

Here, $Enc_1$ (KC,C) is a ciphertext generated by applying encryption algorithm $Enc_1$ of the secret key cipher to content C using content key KC. For example, DES may be used as the secret key cipher. Other secret key ciphers, such as AES (Advanced Encryption Standard) are equally applicable. Secret key cryptography is described in detail in T. Okamoto & H. Yamamoto *Modern Encryption*, Sangyo Tosho, 1997.

The content encryption unit 103 outputs encrypted content EC to the send/receive unit 101.

(5) Key Information Generation Unit 105

The key information generation unit 105 includes a key encryption unit 111, a counter setting unit 112, a counter increment unit 113, a counter judgment unit 114, an output unit 115, a key control unit 116, a parameter storage unit 117, and a counter 118, as shown in FIG. 2.

The parameter storage unit 117 stores base point G, constant a, constant b, and prime p beforehand.

The counter setting unit 112 sets counter i in the counter 118 to 1.

The key encryption unit 111 generates encrypted content key $EKC_i$ corresponding to the content reception device $200_i$, in the following way.

(a) Generate 160-bit random number $k_i$.
(b) Read base point G, constant a, and prime p from the parameter storage unit 117, and calculate $$PC_i = k_i * G,$$

using random number $k_i$, base point G, constant a, and prime p.

Here, elliptic curve point multiplication is performed as follows.

Take, 100*P as one example.

100*P can be expressed as $$100*P = 2(2(P + 2(2(P + 2P)))),$$

which indicates that 100*P is computed by performing six doubling operations and two addition operations on point P on an elliptic curve.

Thus, elliptic curve point multiplication is achieved through addition and doubling operations.

Let elliptic curve $E_1$ be defined by $$y^2 = x^3 + a \times x + b.$$

Given two points $P = (x_1, y_1)$ and $Q = (x_2, y_2)$ on elliptic curve $E_1$, $R = (x_3, y_3)$ is a point on elliptic curve $E_1$ such that $R = P + Q$.

When $P \neq Q$, $R = P + Q$ is an addition operation using addition formulas that are $$x_3 = \{(y_2 - y_1)/(x_2 - x_1)\}^2 - x_1 - x_2, \text{ and}$$

$$y_3 = \{(y_2 - y_1)/(x_2 - x_1)\}(x_1 - x_3) - y_1.$$

When $P = Q$, on the other hand, $R = P + Q = P + P = 2 \times P$, so that $R = P + Q$ is a doubling operation using doubling formulas that are $$x_3 = \{(3x_1^2 + a)/2y_1\}^2 - 2x_1, \text{ and}$$

$$y_3 = \{(3x_1^2 + a)/2y_1\}(x_1 - x_3) - y_1.$$

Note that the above operations are carried out on finite field GF(p) where elliptic curve $E_1$ is defined.

For details on elliptic curve algorithms, see "Efficient Elliptic Curve Exponentiation" in Miyaji, Ono & Cohen *Advances in Cryptology-Proceedings of ICICS'97, Lecture Notes in Computer Science*, Springer-Verlag, 1997, pp. 282-290.

(c) Read public key $KP_i$ from the public key storage unit 104, and calculate $$k_i * KP_i,$$

using random number $k_i$, public key $KP_i$, constant a, and prime p.

Here, elliptic curve point multiplication is performed as explained above.

(d) Receive content key KC from the content key generation unit 102, and convert content key KC to point P_KC=f (KC) on elliptic curve $E_1$ using conversion function f. Conversion function f is explained in detail later.

(e) Calculate $$P\_KC + k_i * KP_i.$$

(f) Read prime p from the parameter storage unit 117, and judge whether $y(PC_i)$, which is the y coordinate of point $PC_i$, satisfies $$y(PC_i) < (p-1)/2,$$

if $y(PC_i) < (p-1)/2$, then set $$C_i = P\_KC + k_i * KP_i, \text{ and}$$

if $y(PC_i) \geq (p-1)/2$, then set $$C_i = -(P\_KC + k_i * KP_i).$$

(g) Output $x(PC_i)$, which is the x coordinate of point $PC_i$, and point $C_i$ to the output unit 115 as encrypted content key $EKC_i$.

The counter judgment unit 114 judges whether counter i is n.

The counter increment unit 113 increments counter i by 1, if the counter judgment unit 114 judges that i≠n. After this, the above procedure (a) to (g) is repeated.

The output unit 115 outputs encrypted content keys $EKC_1$, $EKC_2$, $EKC_3$, ..., $EKC_n$ to the send/receive unit 101 as encrypted content key information EKC, if the counter judgment unit 114 judges that i=n.

The key control unit 116 controls the construction elements in the key information generation unit 105.

The above procedure (a) to (g) employs a modification to the conventional elliptic curve ElGamal cipher. The difference from the conventional elliptic curve ElGamal cipher lies in the following point. While a ciphertext is made up of $C_i$ and $PC_i$ in the conventional elliptic curve ElGamal cipher, a ciphertext is made up of $C_i$ and the x coordinate of $PC_i$ in the modified cipher of this embodiment. In other words, the main feature of this embodiment is that information relating to the y coordinate of $PC_i$ is not included at all (not even 1 bit) in encrypted content key information EKC.

(6) Send/Receive Unit 101

The send/receive unit 101 receives encrypted content EC from the content encryption unit 103, and encrypted content key information EKC from the key information generation unit 105. The send/receive unit 101 transmits encrypted content EC and encrypted content key information EKC to each of the content reception devices $200_1$, $200_2$, ..., $200_n$ via the Internet 20.

Figure 3:
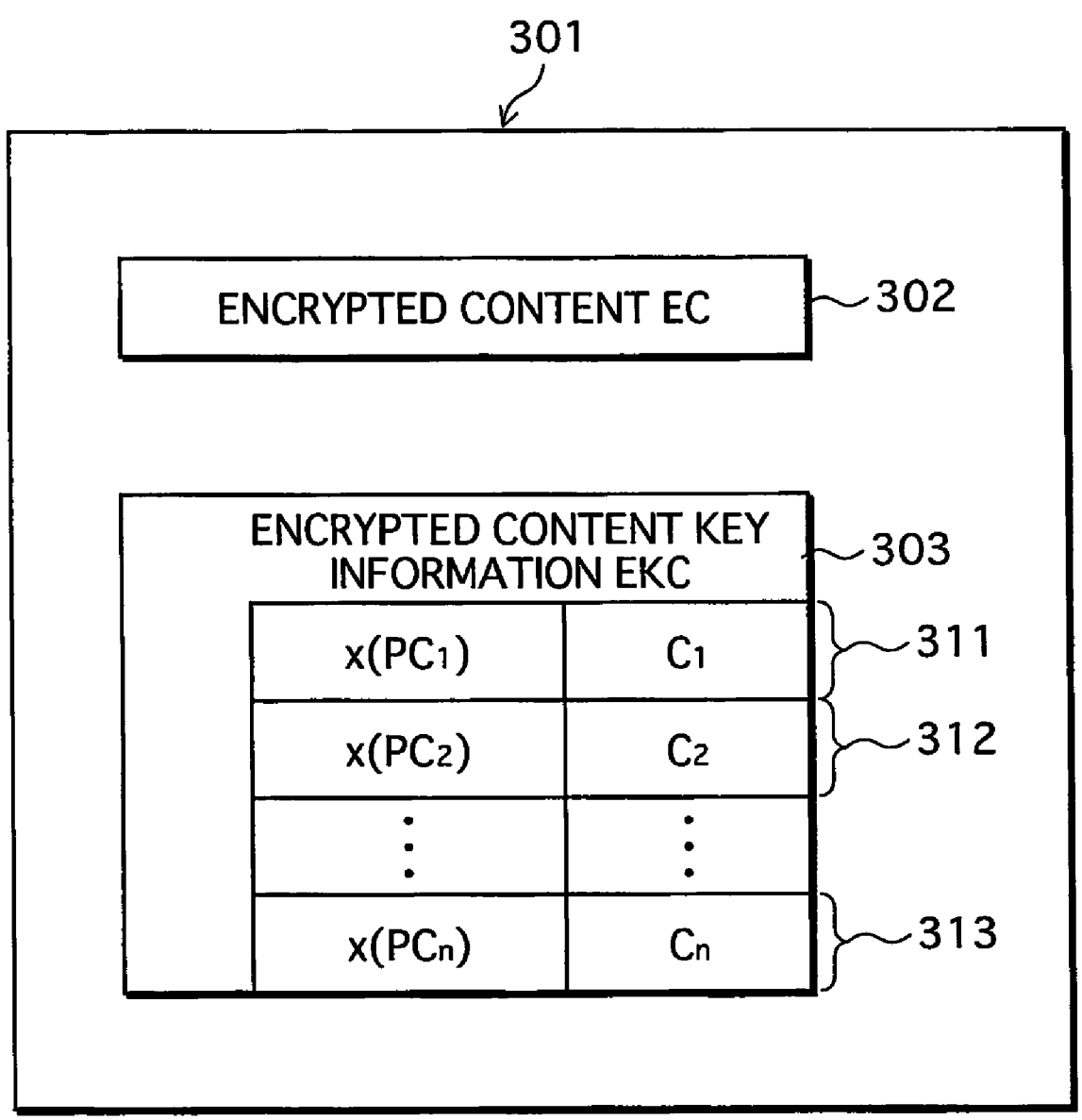
FIG. 3 shows a data structure of transmission information which is transmitted from a send/receive unit in the content delivery device to each content reception device.

FIG. 3 shows a data structure of transmission information 301 that is transmitted from the send/receive unit 101 to each of the content reception devices $200_1$, $200_2$, ..., $200_n$. As illustrated, the transmission information 301 is composed of encrypted content EC 302 and encrypted content key information EKC 303. The encrypted content key information EKC 303 contains n encrypted content keys 311, 312, ..., 313. The ith encrypted content key, i.e. $EKC_i$, includes $x(PC_i)$ (the x coordinate of $PC_i$) and $C_i$.

Lengths of $x(PC_i)$ and $C_i$ are fixed. In detail, $x(PC_i)$ is 160 bits long whereas $C_i$ is 320 bits long. In encrypted content key information EKC, the n encrypted content keys are arranged in the order of the device ID numbers assigned to the n content reception devices $200_1$, $200_2$, ..., $200_n$, so as to correspond one-to-one with the n content reception devices $200_1$, $200_2$, ..., $200_n$. This being so, an encrypted content key corresponding to a content reception device can be specified by a device ID number assigned to that content reception device.

As one example, $x(PC_1)$ (the x coordinate of $PC_1$) and $C_1$ which constitute encrypted content key $EKC_1$ corresponding to the content reception device $200_1$ with the device ID number "1" can be obtained by extracting 480 (=160+320) bits from the start of encrypted content key information EKC.

In general, $x(PC_i)$ (the x coordinate of $PC_i$) and $C_i$ which constitute encrypted content key $EKC_i$ corresponding to the content reception device $200_i$ with the device ID number "i" can be obtained by extracting 480 bits beginning with the $(1+(i-1)\times 480)$th bit from the start of encrypted content key information EKC.

(7) Control Unit 107, Input Unit 108, and Display Unit 109

The control unit 107 controls the construction elements in the content delivery device 100.

The input unit 108 receives an input of information or an instruction from an operator of the content delivery device 100, and outputs the received information or instruction to the control unit 107.

The display unit 109 displays various information under control of the control unit 107.

1.5. Construction of the Content Reception Devices $200_1$, $200_2$, ..., $200_n$ The content reception devices $200_1$, $200_2$, ..., $200_n$ have the same construction. The following describes the construction of the content reception device $200_i$ as one example.

Figure 4:
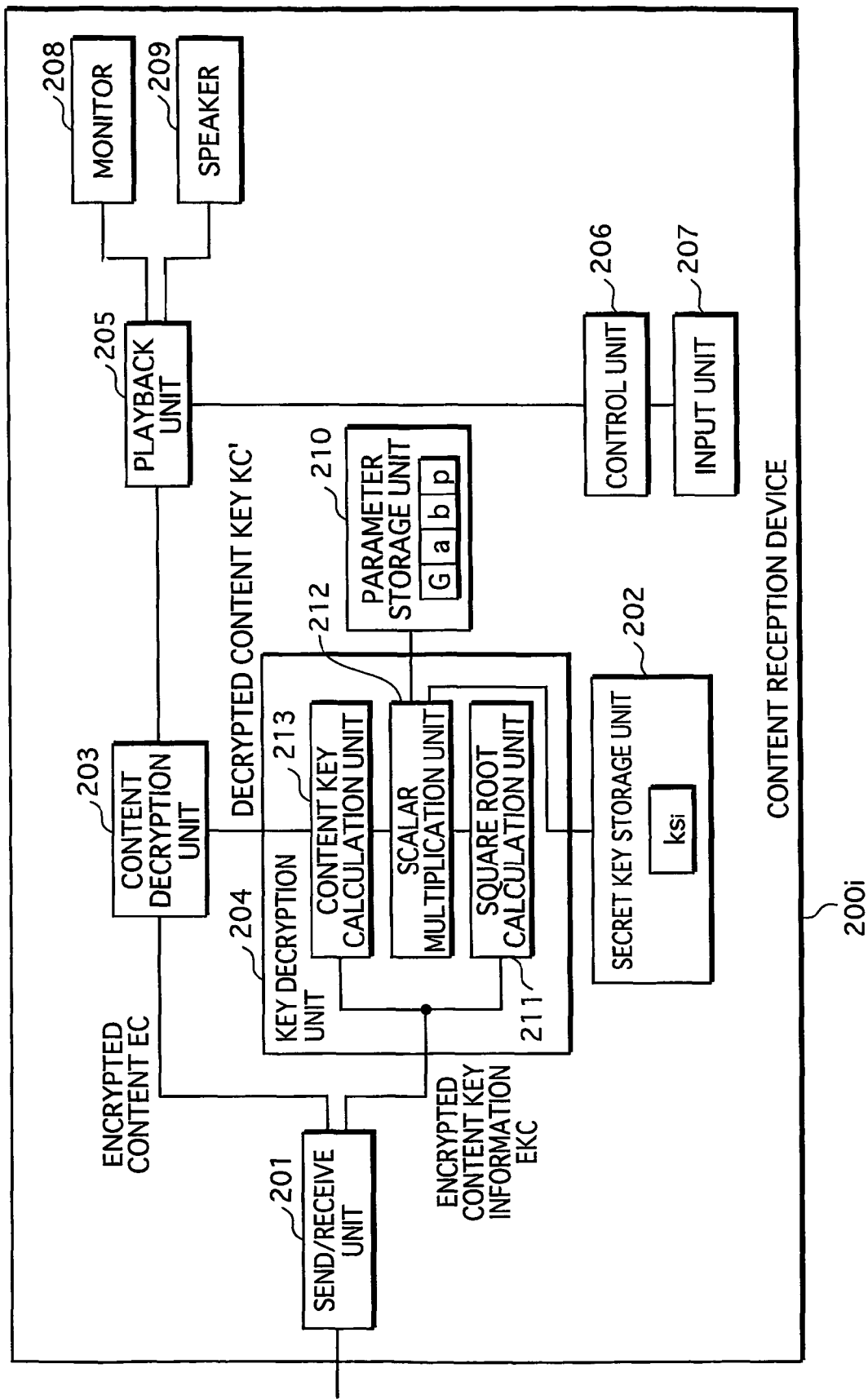
FIG. 4 is a block diagram showing a construction of a content reception device shown in FIG. 1.

FIG. 4 is a block diagram showing the construction of the content reception device $200_i$. As shown in the drawing, the content reception device $200_i$ includes a send/receive unit 201, a secret key storage unit 202, a content decryption unit 203, a key decryption unit 204, a playback unit 205, a control unit 206, an input unit 207, a monitor 208, a speaker 209, and a parameter storage unit 210.

The content reception device $200_i$ is actually realized by a computer system that includes a microprocessor, a ROM, and a RAM, like the content delivery device 100. A computer-readable program is stored in the RAM. Functions of the content reception device $200_i$ are realized by the microprocessor operating in accordance with this computer-readable program.

It is to be noted here that the subscript "i" of the reference sign "$200_i$" is a device ID number that uniquely identifies the content reception device $200_i$.

(1) Secret Key Storage Unit 202 and Parameter Storage Unit 210

The secret key storage unit 202 stores 160-bit secret key $ks_i$ in secrecy, beforehand. The secret key storage unit 202 is accessible only by the key decryption unit 204.

Secret key $ks_i$ corresponds to public key $KP_i$. As mentioned above, public key $KP_i$ is calculated by $$KP_i = ks_i * G.$$

The parameter storage unit 210 stores base point G, constant a, constant b, and prime p in advance.

(2) Send/Receive Unit 201

The send/receive unit 201 receives encrypted content EC and encrypted content key information EKC from the content delivery device 100 via the Internet 20. The send/receive unit 201 outputs encrypted content EC to the content decryption unit 203, and encrypted content key information EKC to the key decryption unit 204.

(3) Key Decryption Unit 204

The key decryption unit 204 includes a square root calculation unit 211, a scalar multiplication unit 212, and a content key calculation unit 213, as shown in FIG. 4.

(Square Root Calculation Unit 211)

The square root calculation unit 211 stores the device ID number "i" assigned to the content reception device $200_i$, beforehand.

The square root calculation unit 211 receives encrypted content key information EKC from the send/receive unit 201, and reads the device ID number "i". The square root calculation unit 211 specifies $x(PC_i)$ (the x coordinate of $PC_i$) corresponding to the content reception device $200_i$ in encrypted content key information EKC using the device ID number "i", as explained above. The square root calculation unit 211 extracts $x(PC_i)$ from encrypted content key information EKC.

The square root calculation unit 211 then finds, for $x(PC_i)$, two square roots rt of $$z = x(PC_i)^3 + a \times x(PC_i) + b$$

on GF(p).

Here, one of two square roots rt is smaller than $(p-1)/2$ and the other is no smaller than $(p-1)/2$. The square root calculation unit 211 selects square root rt that is smaller than $(p-1)/2$. The square root calculation unit 211 then sets $$PC_i'=(x(PC_i),rt),$$

using extracted $x(PC_i)$ and selected rt. The square root calculation unit 211 outputs PCi' to the scalar multiplication unit 212.

Square root calculation is described in detail in Henri Cohen *A Course in Computational Algebraic Number Theory* (*Graduate Texts in Mathematics*, Vol. 138), Springer-Verlag, 1993, pp. 31-33.

The following explains how to find square root rt on GF(p) when $p=3 \mod 4$. For details of other square root calculation methods, see the above document by Cohen.

Here; "d mod e" denotes a remainder when dividing d by e. Square root rt of z is either $z^{(p+1)/4}$ or $-z^{(p+1)/4}$.

In general, $$z^{(p-1)}=1 \mod p$$

holds true. This being so, $$z^{(p+1)}=z^2 \mod p,$$

so that $$z^{((p+1)/4)}=(z^2)^{1/4}=z^{1/2},$$

which is a square root of z.

(Scalar Multiplication Unit 212)

The scalar multiplication unit 212 reads secret key $ks_i$ from the secret key storage unit 202, and receives $PC_i'$ from the square root calculation unit 211. The scalar multiplication unit 212 also reads constant a and prime p from the parameter storage unit 210, and computes point $$ks_i*PC_i',$$

by multiplying $PC_i'$ by $ks_i$, using constant a, prime p, and secret key $ks_i$.

Here, elliptic curve point multiplication is performed as described above.

The scalar multiplication unit 212 outputs point $ks_i*PC_i'$ to the content key calculation unit 213.

(Content Key Calculation Unit 213)

The content key calculation unit 213 receives point $ks_i*PC_i'$ from the scalar multiplication unit 212, and calculates $$P\_KC'=C_i-ks_i*PC_i',$$

using $C_i$ included in encrypted content key $EKC_i$ in encrypted content key information EKC. The content key calculation unit 213 then converts P_KC' to an integer to thereby obtain decrypted content key $$KC'=f^{-1}(P\_KC'),$$

Here, $f^{-1}$ is an inverse of conversion function f. Decrypted content key KC' obtained in this way is expected to be equal to content key KC. The content key calculation unit 213 outputs decrypted content key KC' to the content decryption unit 203.

(4) Content Decryption Unit 203

The content decryption unit 203 receives encrypted content EC from the send/receive unit 201, and decrypted content key KC' from the key decryption unit 204. The content decryption unit 203 decrypts encrypted content EC using decrypted content key KC' according to decryption algorithm $Dec_1$ of the secret key cipher, to generate decrypted content $$C'=Dec_1(KC',EC).$$

Here, $Dec_1(KC',EC)$ is a decrypted text obtained by applying decryption algorithm $Dec_1$ of the secret key cipher to encrypted content EC using decrypted content key KC'.

The content decryption unit 203 outputs decrypted content C' to the playback unit 205.

(5) Playback Unit 205, Control Unit 206, Input Unit 207, Monitor 208, and Speaker 209

The playback unit 205 receives decrypted content C' from the content decryption unit 203, and obtains video data and audio data from decrypted content C'. The playback unit 205 converts the video data and audio data to an analog video signal and audio signal, and outputs them respectively to the monitor 208 and the speaker 209.

The monitor 208 receives the analog video signal from the playback unit 205, and displays images.

The speaker 209 receives the analog audio signal from the playback unit 205, and outputs sounds.

The control unit 206 controls the construction elements in the content reception device $200_i$.

The input unit 207 receives an instruction from a user of the content reception device $200_i$, and outputs the received instruction to the control unit 206.

1.6. Conversion Function f and Inverse Conversion Function $f^{-1}$

Conversion function f and inverse conversion function $f^{-1}$ are explained below.

Conversion function f converts an integer which has a smaller bit size than field of definition GF(p), to a corresponding point on elliptic curve $E_1$. Meanwhile, inverse conversion function $f^{-1}$ converts a point on elliptic curve $E_1$ to a corresponding integer which has a smaller bit size than field of definition GF(p). Conversion function f is an injection. Any function can be used so long as the following two conditions are satisfied:

$$f^{-1}(f(v))=v,$$

where v is an integer; and $$f^{-1}(-P)=f^{-1}(P),$$

where P is a point on elliptic curve $E_1$. For details of conversion, see Neal Koblitz *A Course in Number Theory and Cryptography*, Springer-Verlag, 1987, pp. 162-163.

A conversion method described in the above document by Koblitz is explained below.

(1) The bit size of field of definition GF(p) is denoted by lenp, and the bit size of v is denoted by lenp−10. That is, v is 10 bits smaller than field of definition GF(p). Let c=0 and $x\_fv=c\|v$. This being so, judge whether $$(x\_fv)^3+a\times x\_fv+b$$

is a quadratic residue on GF(p).

(2) If the judgment is affirmative, find square root y_fv of $(x\_fv)^3+a\times x\_fv+b$, and set $f(v)=(x\_fv,y\_fv)$.

(3) If the judgment is negative, increment c by 1 and set $x\_fv=c\|v$. Then judge once again whether $$(x\_fv)^3+a\times x\_fv+b$$

is a quadratic residue on GF(p). If the judgment is affirmative, find square root y_fv of $(x\_fv)^3+a\times x\_fv+b$, and set $f(v)=(x\_fv,y\_fv)$. If the judgment is negative, increment c by 1, and perform the same judgment. This is repeated until $(x\_fv)^3+a\times x\_fv+b$ which is a quadratic residue on GF(p) is obtained.

An inverse conversion method $f^{-1}(P\_fv)$ is explained next.

When $P\_fv=(x\_fv,y\_fv)$, $f^{-1}(P\_fv)$ is set as a number represented by the lower (lenp−10) bits of $x\_fv$. According to this method, it is obvious that $$f^{-1}(f(v))=v.$$

Also, since $f^{-1}(P\_fv)$ is the lower bits of the x coordinate of $P\_fv$, it is obvious that $$f^{-1}(-P)=f^{-1}(P).$$

As mentioned earlier, conversion function f and inverse conversion function $f^{-1}$ are not limited to those described in the above document by Koblitz, so long as function if is an injection, $f^{-1}(f(v))=v$ holds true where v is an integer, and $f^{-1}(-P)=f^{-1}(P)$ holds true where P is a point on elliptic curve $E_1$.

1.7. Reason that Decrypted Content Key KC' is Equal to Content Key KC

If $f^{-1}(P\_KC')=f^{-1}(P\_KC)$, decrypted content key KC' is equal to content key KC. The reason that $f^{-1}(P\_KC')=f^{-1}(P\_KC)$ holds true is given below.

On an elliptic curve defined over GF(p), −P which is a corresponding negative point of $P=(x_1,y_1)$ is generally given by $-P=(x_1,-y_1)$. Square root rt satisfies $$rt^2=x(PC_i)^3+a\times x(PC_i)+b.$$

Likewise, $y(PC_i)$ which is the y coordinate of point $PC_i$ satisfies $$y(PC_i)^2=x(PC_i)^3+a\times x(PC_i)+b.$$

Hence $$y(PC_i)=rt,$$

or $$y(PC_i)=-rt.$$

If $y(PC_i)=rt$, that is, $y(PC_i)<(p-1)/2$, then $PC_i=PC_i'$. Substituting $PC_i=PC_i'$ and $C_i=P\_KC+k_i*KP_i$ yields $$P\_KC'=C_i-ks_i*PC_i'=P\_KC+k_i*KP_i-ks_i*PC_i.$$

Here, $$k_i*KP_i=k_i*ks_i*G=ks_i*PC_i,$$

so that $$P\_KC'=P\_KC.$$

Therefore $$f^{-1}(P\_KC')=f^{-1}(P\_KC)$$

is true.

On the other hand, if $y(PC_i)=-rt$, that is, $y(PC_i)\geq(p-1)/2$, then $PC_i'=-PC_i$. Substituting $PC_i'=-PC_i$ and $C_i=-(P\_KC+k_i*KP_i)$ yields $$P\_KC'=C_i-ks_i*PC_i'=-(P\_KC+k_i*KP_i)-ks_i*(-PC_i)$$
$$=-P\_KC.$$

Given that $$f^{-1}(-P\_KC)=f^{-1}(P\_KC),$$

then $$f^{-1}(P\_KC')=f^{-1}(P\_KC)$$

is true.

As demonstrated above, $$f^{-1}(P\_KC')=f^{-1}(P\_KC)$$

is true, so that decrypted content key KC' is equal to content key KC.

1.8. Operations of the Content Delivery System 10

The following describes operations of the content delivery system 10.

(1) Overall Operation of the Content Delivery System 10

Figure 5:
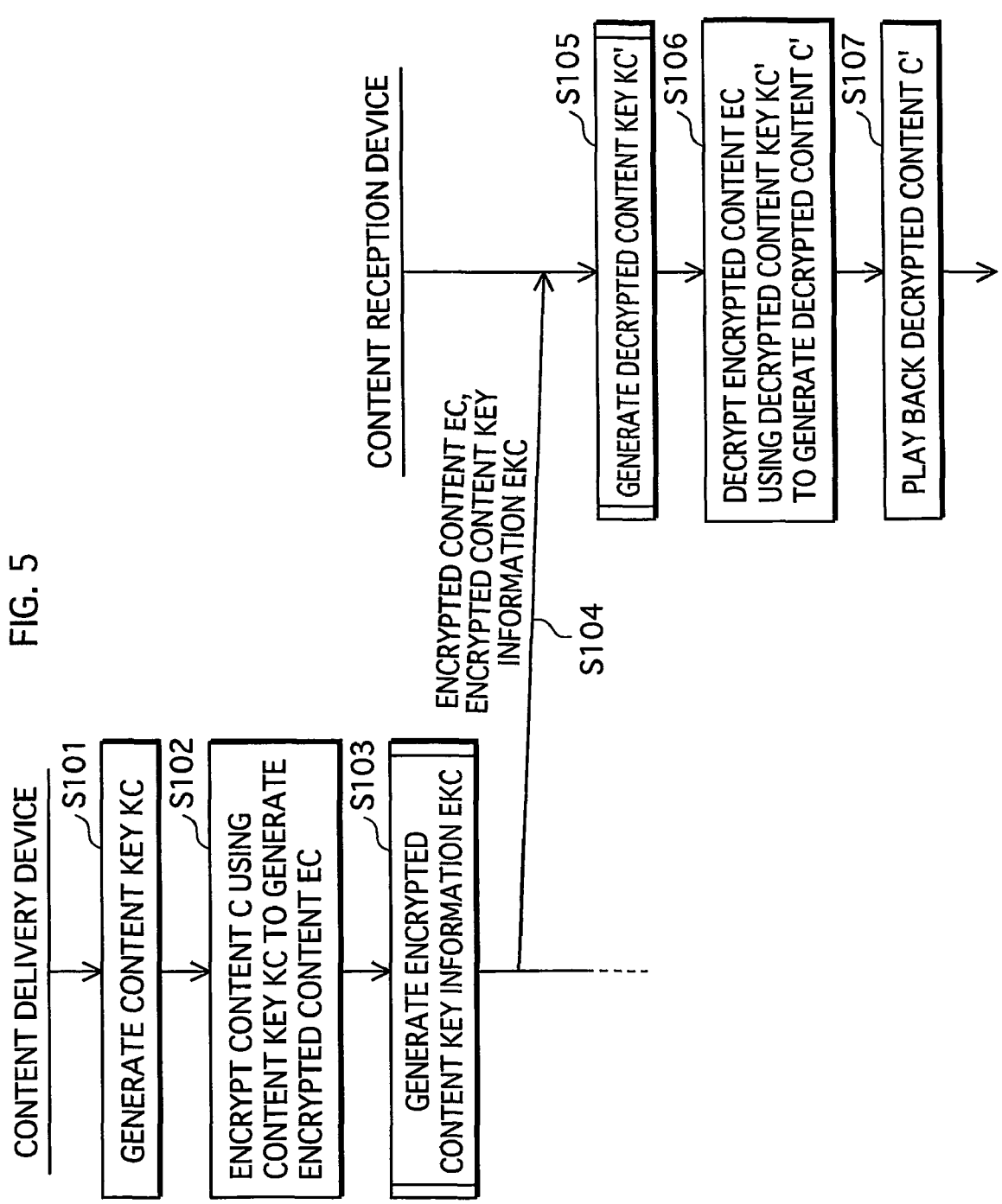
FIG. 5 is a flowchart showing an overall operation of the content delivery system shown in FIG. 1.

FIG. 5 is a flowchart showing an overall operation of the content delivery system 10.

In the content delivery device 100, the content key generation unit 102 generates content key KC (S101), and the content encryption unit 103 encrypts content C using content key KC to generate encrypted content EC (S102). Also, the key information generation unit 105 generates encrypted content key information EKC (S103). The send/receive unit 101 transmits encrypted content EC and encrypted content key information EKC to each of the content reception devices $200_1, 200_2, \ldots, 200_n$ via the Internet 20 (S104).

In the content reception device $200_i$ as an example of the content reception devices $200_1, 200_2, \ldots, 200_n$, the send/receive unit 201 receives encrypted content EC and encrypted content key information EKC from the content delivery device 100 via the Internet 20 (S104). The key decryption unit 204 decrypts encrypted content key $EKC_i$ included in encrypted content key information EKC using secret key $ks_i$ stored in the secret key storage unit 202, to generate decrypted content key KC' (S105). The content decryption unit 203 decrypts encrypted content EC using decrypted content key KC', to generate decrypted content C' (S106). The playback unit 205 plays back decrypted content C' (S107).

(2) Operation of Generating Encrypted Content Key Information EKC

Figure 6:
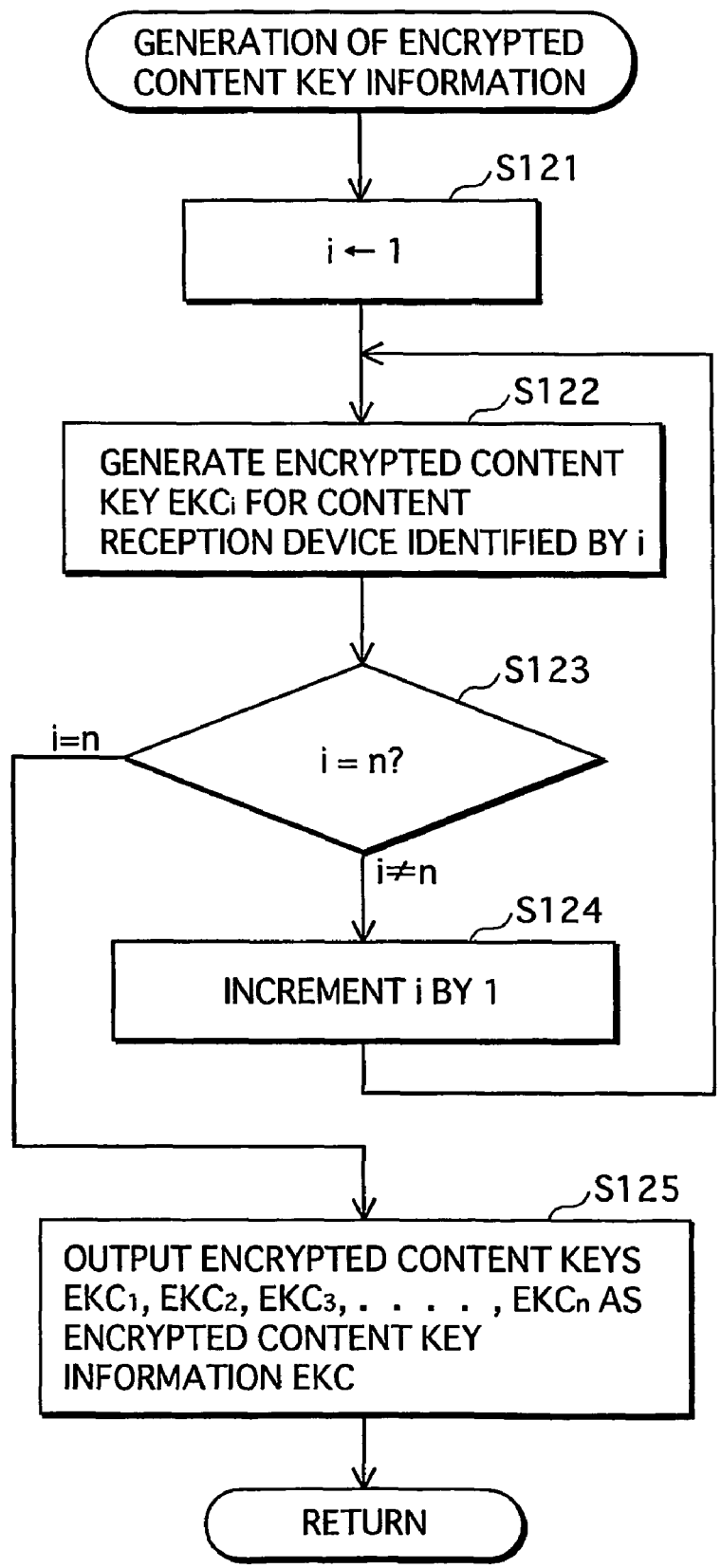
FIG. 6 is a flowchart showing an operation of generating encrypted content key information EKC by a key information generation unit in the content delivery device shown in FIG. 2.

FIG. 6 is a flowchart showing an operation of generating encrypted content key information EKC by the key information generation unit 105 in the content delivery device 100. This operation corresponds to step S103 in FIG. 5.

The counter setting unit 112 sets counter i to 1 (S121).

The key encryption unit 111 generates encrypted content key $EKC_i$ corresponding to the content reception device $200_i$ (S122). The counter judgment unit 114 judges whether i=n (S123). If i≠n, the counter increment unit 113 increments i by 1 (S124). The operation then returns to step S122.

If i=n, the output unit 115 outputs encrypted content keys $EKC_1, EKC_2, EKC_3, \ldots, EKC_n$ to the send/receive unit 101 as encrypted content key information EKC (S125).

(3) Operation of Generating Encrypted Content Key $EKC_i$

Figure 7:
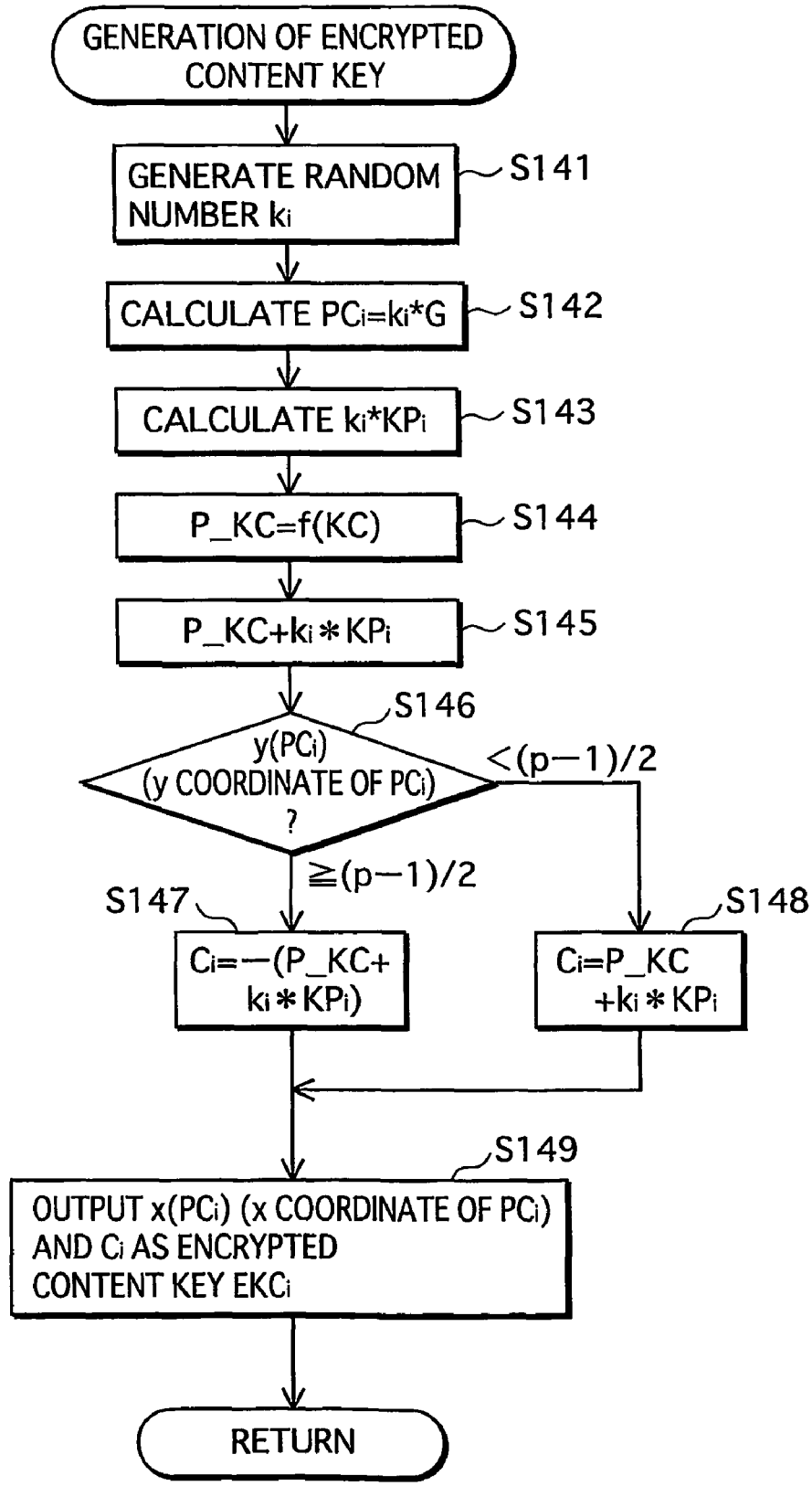
FIG. 7 is a flowchart showing an operation of generating encrypted content key $EKC_i$ by a key encryption unit in the key information generation unit.

FIG. 7 is a flowchart showing an operation of generating encrypted content key $EKC_i$ by the key encryption unit 111 in the key information generation unit 105. This operation corresponds to step S122 in FIG. 6.

The key encryption unit 111 generates random number $k_i$ (S141), and calculates $PC_i=k_i*G$ (S142). The key encryption unit 111 also calculates $k_i*KP_i$ (S143). The key encryption unit 111 converts content key KC to point $P\_KC=f(KC)$ on elliptic curve $E_1$ (S144). The key encryption unit 111 then calculates $P\_KC+k_i*KP_i$ (S145).

After this, the key encryption unit 111 judges whether $y(PC_i)$, which is the y coordinate of $PC_i$, satisfies $y(PC_i)<(p-1)/2$ (S146). If $y(PC_i)<(p-1)/2$, the key encryption unit 111 sets $C_i=P\_KC+k_i*KP_i$ (S148). Otherwise, the key encryption unit 111 sets $C_i=-(P\_KC+k_i*KP_i)$ (S147).

The key encryption unit 111 outputs $x(PC_i)$, which is the x coordinate of $PC_i$, and $C_1$ as encrypted content key $EKC_i$ (S149).

(4) Operation of Generating Decrypted Content Key KC'

Figure 8:
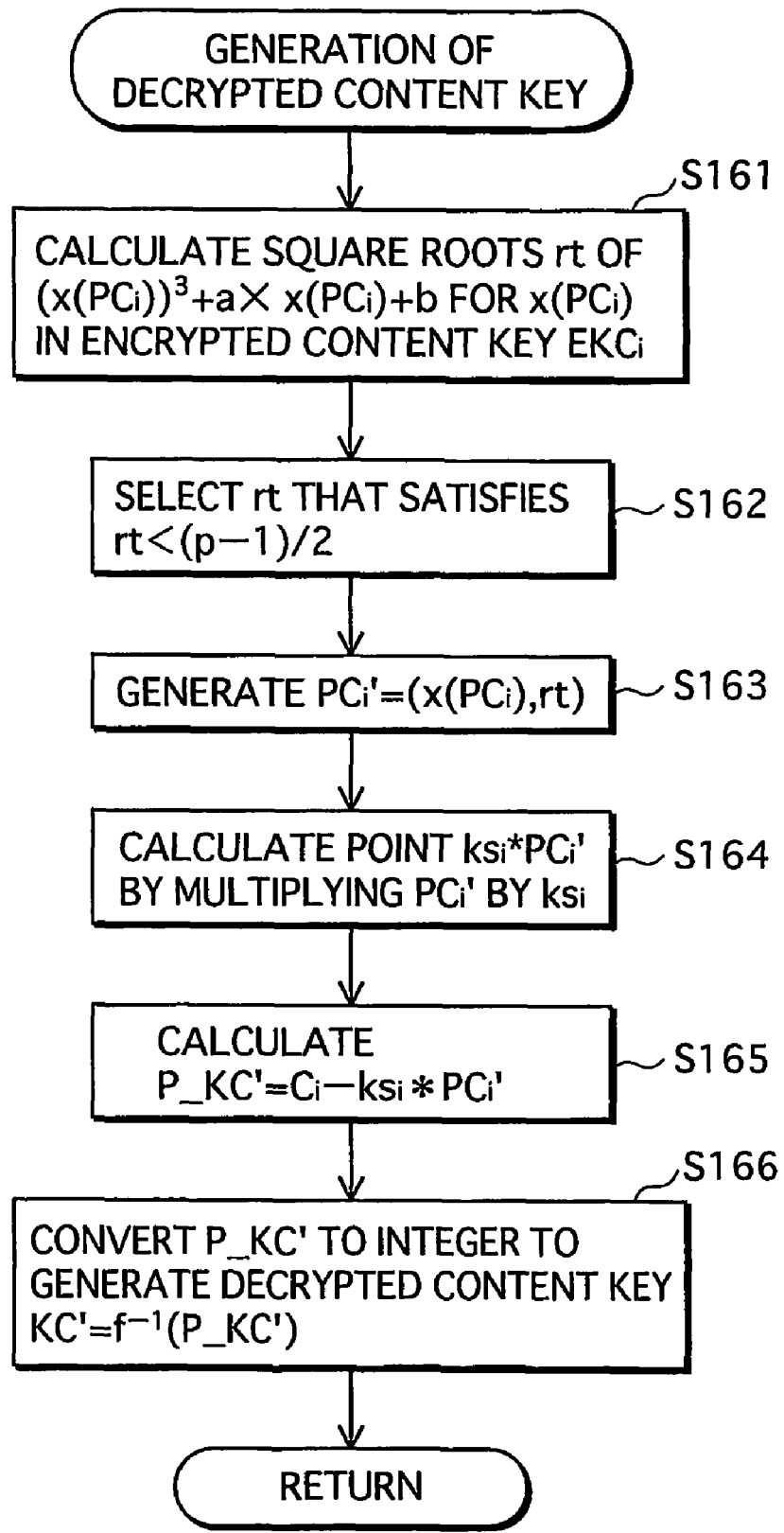
FIG. 8 is a flowchart showing an operation of generating decrypted content key KC' by a key decryption unit in the content reception device shown in FIG. 4.

FIG. 8 is a flowchart showing an operation of generating decrypted content key KC' by the key decryption unit 204 in the content reception device 200i. This operation corresponds to step S105 in FIG. 5.

The square root calculation unit 211 calculates two square roots rt of $x(PC_i)^3+a \times x(PC_i)+b$ for $x(PC_i)$ which is included in encrypted content key $EKC_i$ (S161). The square root calculation unit 211 selects square root rt, out of two square roots rt, that satisfies $rt<(p-1)/2$ (S162). The square root calculation unit 211 then generates $PC_i'=(x(PC_i),rt)$ (S163).

Next, the scalar multiplication unit 212 calculates point $ks_i*PC_i'$ by multiplying $PC_i'$ by $ks_i$ (S164).

Following this, the content key calculation unit 213 calculates $P\_KC'=C_i-ks_i*PC_i'$ (S165). The content key calculation unit 213 then converts $P\_KC'$ to an integer to thereby generate decrypted content key $KC'=f^{-1}(P\_KC')$ (S166).

Such decrypted content key $KC'$ is expected to be equal to content key KC.

1.9. Effects of the First Embodiment

The following examines the data size of encrypted content key $EKC_i$ in the content delivery system 10.

For simplicity's sake, field of definition GF(p) of elliptic curve $E_1$ is assumed to be 160 bits long that is currently recommended in elliptic curve cryptography.

Encrypted content key $EKC_i$ corresponding to one content reception device $200_i$ is made up of one point $C_i$ and the x coordinate of one point $PC_i$, i.e. $x(PC_i)$. $C_i$ is made up of x and y coordinates that are each 160 bits long, and therefore is 320 bits long. The x coordinate of $PC_i$ is 160 bits long. Hence encrypted content key $EKC_i$ is 320+160=480 bits (=60 bytes).

The data size of each encrypted content key in the conventional technique is 80 bytes. Accordingly, the content delivery system 10 of the first embodiment enables the data size of each encrypted content key to be reduced by ¾, when compared with that of the conventional technique.

Suppose the number n of content reception devices is 1,000,000. According to the first embodiment, the data size of encrypted content key information EKC is 60×1,000,000=60,000,000 bytes (=60 megabytes). According to the conventional technique, meanwhile, the data size of encrypted content key information is 80×1,000,000=80,000,000 bytes (=80 megabytes).

Thus, the content delivery system 10 of the first embodiment enables the data size of encrypted content key information to be reduced by 20 megabytes, when compared with that of the conventional technique.

2. Second Embodiment

The following describes a content delivery system 10b (not illustrated) to which the second embodiment of the present invention relates.

The content delivery system 10b has a similar construction to the content delivery system 10 of the first embodiment. The following description focuses on the differences from the content delivery system 10.

Like the content delivery system 10, the content delivery system 10b is roughly made up of one content delivery device 100b and n content reception devices $200b_1$, $200b_2$, $200b_i$, ..., $200b_n$. The content delivery device 100b is connected to each of the content reception devices $200b_1$, $200b_2$, ..., $200b_n$ via the Internet 20.

2.1. Construction of the Content Delivery Device 100b

The content delivery device 100b has a similar construction to the content delivery device 100. In detail, the content delivery device 100b includes the send/receive unit 101, the content key generation unit 102, the content encryption unit 103, the public key storage unit 104, a key information generation unit 105b, the content storage unit 106, and the control unit 107. The control unit 107 is connected to the input unit 108 and the display unit 109 (not illustrated).

Which is to say, the content delivery device 100b differs from the content delivery device 100 in that the key information generation unit 105 is replaced with the key information generation unit 105b.

The following description focuses on the differences from the content delivery device 100.

(1) Key Information Generation Unit 105b

The key information generation unit 105b has a similar construction to the key information generation unit 105. In detail, the key information generation unit 105b includes a key encryption unit 111b, the counter setting unit 112, the counter increment unit 113, the counter judgment unit 114, the output unit 115, the key control unit 116, the parameter storage unit 117, and the counter 118 (not illustrated).

Which is to say, the key information generation unit 105b differs from the key information generation unit 105 in that the key encryption unit 111 is replaced with the key encryption unit 111b. The following description focuses on the differences from the key information generation unit 105.

The key encryption unit 111b generates encrypted content key $EKC_i$ corresponding to the content reception device $200b_i$, in the following manner.

(a) Generate 160-bit random number $k_i$.

(b) Read base point G, constant a, and prime p from the parameter storage unit 117, and calculate $$PC_i=k_i*G,$$

using random number $k_i$, base point G, constant a, and prime p.

(c) Read public key $KP_i$ from the public key storage unit 104, and calculate $$k_i*KP_i,$$

using random number $k_i$, public key $KP_i$, constant a, and prime p.

(d) Receive content key KC from the content key generation unit 102, and calculate $$s_i=KC \, xor \, x(k_i*KP_i)$$

for $k_i*KP_i$, using content key KC. Here, $x(k_i*KP_i)$ is the x coordinate of $k_i*KP_i$, and xor is an operator for an exclusive-OR operation. Also, $s_i$ is a scalar.

(e) Output $x(PC_i)$ (the x coordinate of $PC_i$) and $s_i$ to the output unit 115 as encrypted content key $EKC_i$.

(2) Output Unit 115

The output unit 115 outputs encrypted content keys $EKC_1$, $EKC_2$, $EKC_3$, ..., $EKC_n$ to the send/receive unit 101 as encrypted content key information EKC.

(3) Send/Receive Unit 101

The send/receive unit 101 receives encrypted content EC from the content encryption unit 103, and encrypted content key information EKC from the key information generation unit 105b. The send/receive unit 101 transmits encrypted content EC and encrypted content key information EKC to each of the content reception devices $200b_1$, $200b_2$, ..., $200b_n$ via the Internet 20.

Figure 9:
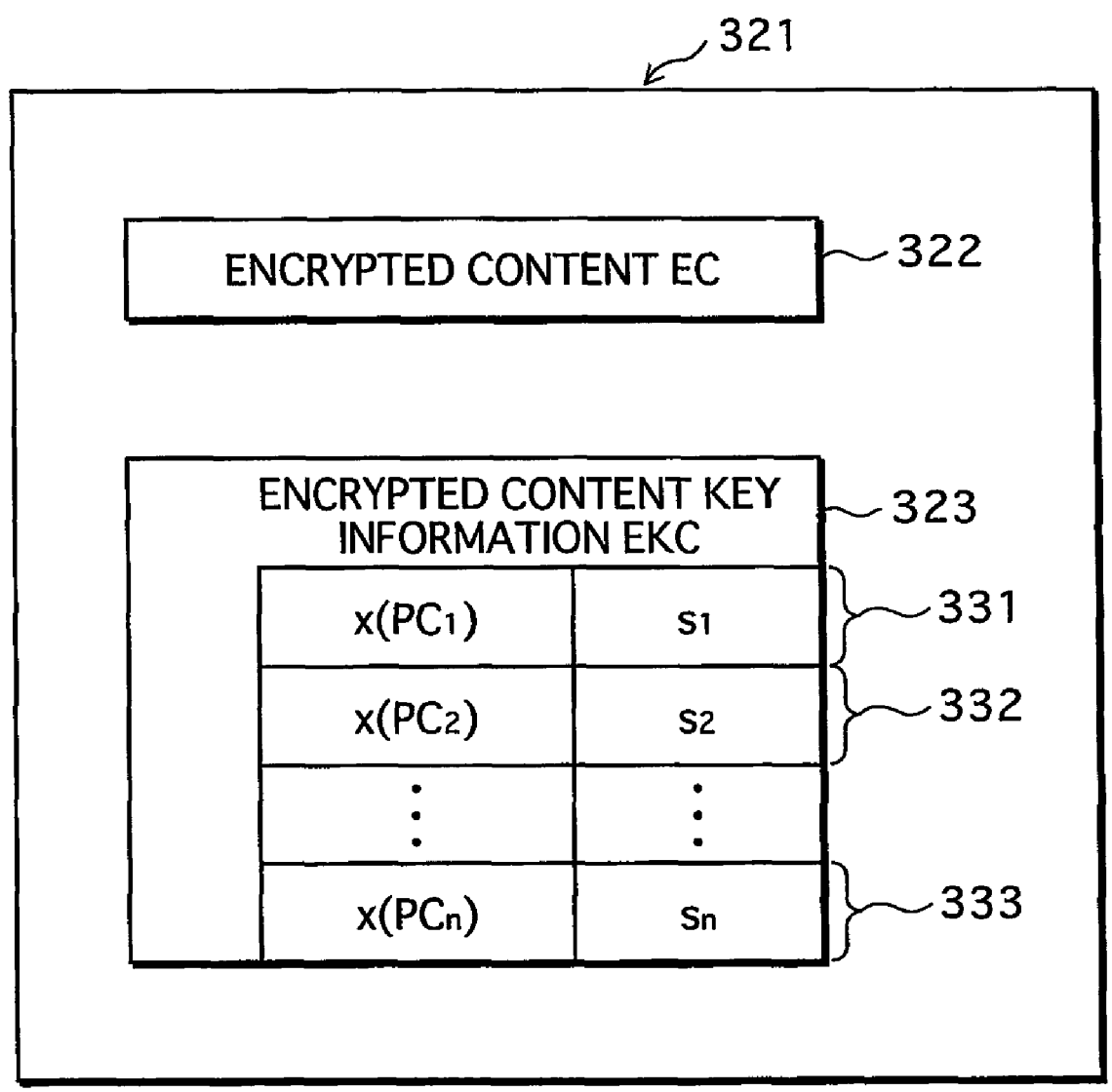
FIG. 9 shows a data structure of transmission information which is transmitted from the send/receive unit in a content delivery device to each content reception device in the second embodiment of the present invention.

FIG. 9 shows a data structure of transmission information 321 that is transmitted from the send/receive unit 101 to each of the content reception devices $200b_1$, $200b_2$, ..., $200b_n$.

As illustrated, the transmission information 321 is composed of encrypted content EC 322 and encrypted content key information EKC 323. The encrypted content key information EKC 323 is made up of n encrypted content keys 331, 332, ..., 333. The ith encrypted content key, i.e. $EKC_i$, is made up of $x(PC_i)$ (the x coordinate of $PC_i$) and $s_i$.

(4) Differences from the First Embodiment

The second embodiment differs from the first embodiment in that a ciphertext is made up of $x(PC_i)$ (the x coordinate of point $PC_i$) and scalar $s_i$, instead of $x(PC_i)$ and point $C_i$. In the second embodiment, information about the y coordinate of $PC_i$ is not included at all (not even 1 bit) in encrypted content key information EKC, as in the first embodiment.

2.2. Construction of the Content Reception Devices $200b_1$, $200b_2$, ..., $200b_n$ The content reception devices $200b_1$, $200b_2$, ..., $200b_n$ have a similar construction to the content reception devices $200_1$, $200_2$, ..., $200_n$.

The construction of the content reception device $200b_i$ is explained below as a representative example of the content reception devices $200b_1$, $200b_2$, ..., $200b_n$, focusing on the differences from the content reception device $200_i$.

The content reception device $200b_i$ has a similar construction to the content reception device $200_i$. In detail, the content reception device $200b_i$ includes the send/receive unit 201, the secret key storage unit 202, the content decryption unit 203, a key decryption unit 204b, the playback unit 205, the control unit 206, the input unit 207, the monitor 208, the speaker 209, and the parameter storage unit 210.

Which is to say, the content reception device $200b_i$ differs from the content reception device $200_i$ in that the key decryption unit 204 is replaced with the key decryption unit 204b.

(1) Key Decryption Unit 204b

The key decryption unit 204b includes the square root calculation unit 211, the scalar multiplication unit 212, and a content key calculation unit 213b (not illustrated).

Which is to say, the key decryption unit 204b differs from the key decryption unit 204 in that the content key calculation unit 213 is replaced with the content key calculation unit 213b.

The square root calculation unit 211 calculates, for $x(PC_i)$ included in encrypted content key $EKC_i$, square root rt of $$z=x(PC_i)^3+a \times x(PC_i)+b,$$

on GF(p), and sets $$PC_i'=(x(PC_i),rt),$$

as explained earlier.

The scalar multiplication unit 212 calculates point $$ks_i*PC_i',$$

by multiplying $PC_i'$ by secret key $ks_i$ stored in the secret key storage unit 202, as explained earlier.

The content key calculation unit 213b receives point $ks_i*PC_i'$ from the scalar multiplication unit 212, and calculates $$s_i \text{ xor } x(ks_i*PC_i')$$

using received point $ks_i*PC_i'$. The content key calculation unit 213b sets the calculation result as decrypted content key KC', where $$KC'=s_i \text{ xor } x(ks_i*PC_i').$$

2.3. Operations of the Content Delivery System 10b

The following describes operations of the content delivery system 10b.

The operations of the content delivery system 10b are similar to those of the content delivery system 10, so that the following description focuses on the differences from the content delivery system 10.

An overall operation of the content delivery system 10b is the same as that shown in FIG. 5, and so its explanation has been omitted here.

An operation of generating encrypted content key information EKC by the key information generation unit 105b in the content delivery device 100b is the same as that shown in FIG. 6, and so its explanation has been omitted here.

(1) Operation of Generating Encrypted Content Key $EKC_i$

Figure 10:
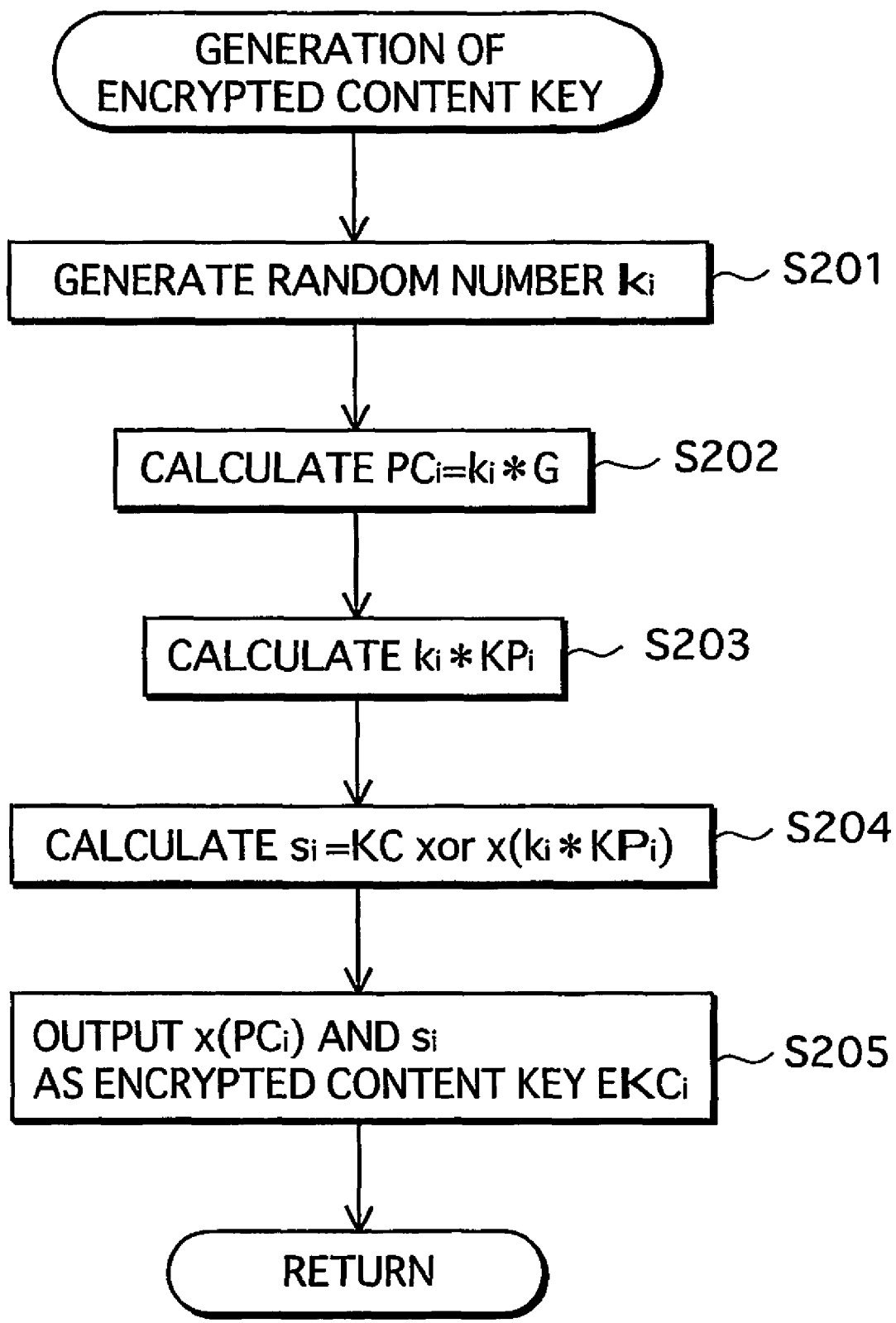
FIG. 10 is a flowchart showing an operation of generating encrypted content key $EKC_i$ by a key encryption unit in a key information generation unit in the content delivery device of the second embodiment.

FIG. 10 is a flowchart showing an operation of generating encrypted content key $EKC_i$ by the key encryption unit 111b in the key information generation unit 105b. This operation corresponds to step S122 in FIG. 6.

The key encryption unit 111b generates 160-bit random number $k_i$ (S201). The key encryption unit 111b reads base point G, constant a, and prime p from the parameter storage unit 117, and calculates $PC_i=k_i*G$ using random number $k_i$, base point G, constant a, and prime p (S202). The key encryption unit 111b also reads public key $KP_i$ from the public key storage unit 104, and calculates $k_i*KP_i$ using random number $k_i$, public key $KP_i$, constant a, and prime p (S203). The key encryption unit 111b computes, for $k_i*KP_i$, $s_i=KC$ xor $x(k_i*KP_i)$ using content key KC received from the content key generation unit 102 (S204). The key encryption unit 111b outputs $x(PC_i)$ (the x coordinate of $PC_i$) and $s_i$ to the output unit 115 as encrypted content key $EKC_i$ (S205).

(2) Operation of Generating Decrypted Content Key KC'

Figure 11:
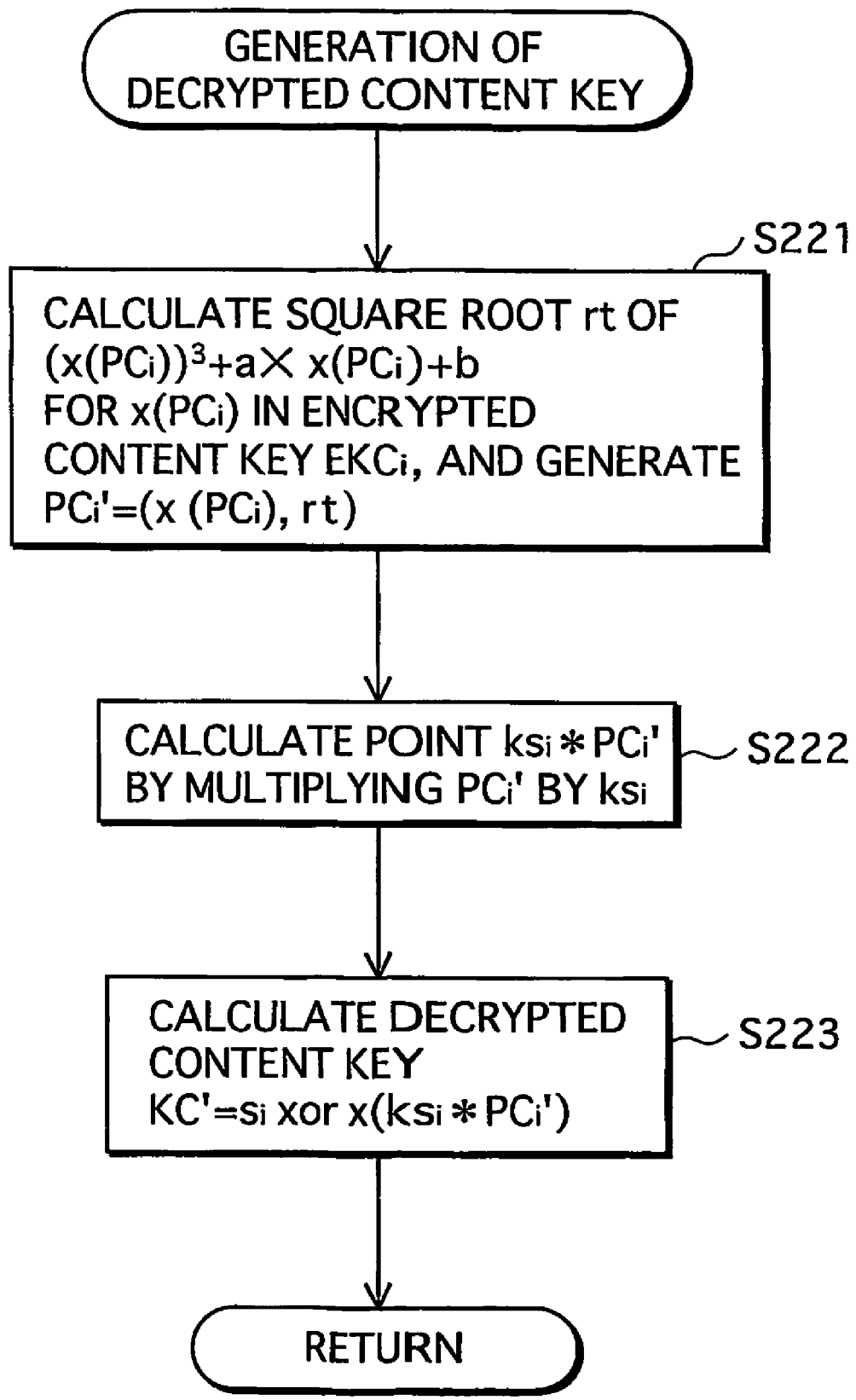
FIG. 11 is a flowchart showing an operation of generating decrypted content key KC' by a key decryption unit in a content reception device of the second embodiment.

FIG. 11 is a flowchart showing an operation of generating decrypted content key KC' by the key decryption unit 204b in the content reception device $200b_i$. This operation corresponds to step S105 in FIG. 5.

The square root calculation unit 211 calculates two square roots rt of $x(PC_i)^3+a \times x(PC_i)+b$ for $x(PC_i)$ which is included in encrypted content key $EKC_i$. The square root calculation unit 211 selects square root rt, out of two square roots rt, that satisfies $rt<(p-1)/2$. The square root calculation unit 211 then generates $PC_i'=(x(PC_i),rt)$ (S221).

Following this, the scalar multiplication unit 212 calculates point $ks_i*PC_i'$ by multiplying $PC_i'$ by $ks_i$ (S222).

The content key calculation unit 213b receives point $ks_i*PC_i'$ from the scalar multiplication unit 212, and calculates $s_i$ xor $x(ks_i*PC_i')$ using received point $ks_i*PC_i'$. The content key calculation unit 213b sets the calculation result as decrypted content key KC' (S223).

Such decrypted content key KC' is expected to be equal to content key KC.

2.4. Reason that Decrypted Content Key KC' is Equal to Content Key KC

When $$x(ks_i*PC_i')=x(ks_i*PC_i)=x(ks_i*k_i*G)=x(k_i*KP_i)$$

holds true, decrypted content key $$KC'=s_i \text{ xor } x(ks_i*PC_i')$$

is equal to content key KC. The reason that $x(ks_i*PC_i')=x(k_i*KP_i)$ holds true is given below.

On an elliptic curve defined over GF(p), −P which is a corresponding negative point of $P=(x_1,y_1)$ is generally given by $-P=(x_1,-y_1)$. Square root rt satisfies $$rt^2=x(PC_i)^3+a \times x(PC_i)+b.$$

Likewise, $y(PC_i)$ which is the y coordinate of point $PC_i$ satisfies $$y(PC_i)^2=x(PC_i)^3+a \times x(PC_i)+b.$$

Hence, $$y(PC_i)=rt$$

or $$y(PC_i)=-rt.$$

If $y(PC_i)=rt$, then $PC_i=PC_i'$. Hence, $$x(ks_i*PC_i')=x(ks_i*PC_i)$$

holds true.
If $y(PC_i)=-rt$, on the other hand, then $PC_i'=-PC_i$. Therefore, $$ks_i*PC_i'=-ks_i*PC_i.$$

Since $x(P)=x(-P)$, $$x(ks_i*PC_i')=x(-ks_i*PC_i)=x(ks_i*PC_i)$$

holds true.
Accordingly, $$x(ks_i*PC_i')=x(k_i*KP_i)$$

is true. As a result, decrypted content key KC' is equal to content key KC.

2.5. Effects of the Second Embodiment

The following examines the data size of encrypted content key $EKC_i$ in the content delivery system 10b.

For simplicity's sake, field of definition GF(p) of elliptic curve $E_1$ is assumed to be 160 bits long that is currently recommended in elliptic curve cryptography.

Encrypted content key $EKC_i$ corresponding to one content reception device $200b_i$ is made up of one scalar $s_i$ and the x coordinate of one point $PC_i$, i.e. $x(PC_i)$. Scalar $s_i$ is 160 bits long. Likewise, the x coordinate of point $PC_i$ is 160 bits long. Therefore, encrypted content key $EKC_i$ is 160+160=320 bits (=40 bytes).

The data size of each encrypted content key according to the conventional technique is 80 bytes. Accordingly, the content delivery system 10b of the second embodiment enables the data size of each encrypted content key to be reduced by ½, when compared with that of the conventional technique.

Suppose the number n of content reception devices is 1,000,000. According to the second embodiment, the data size of encrypted content key information EKC is 40×1,000,000=40,000,000 bytes (=40 megabytes). According to the conventional technique, meanwhile, the data size of encrypted content key information is 80×1,000,000=80,000,000 bytes (=80 megabytes).

Thus, the content delivery system 10b of the second embodiment enables the data size of encrypted content key information to be reduced by 40 megabytes, when compared with that of the conventional technique.

3. Third Embodiment

The following describes a content delivery system 10c (not illustrated) to which the third embodiment of the present invention relates.

The content delivery system 10c has a similar construction to the content delivery system 10. The following description focuses on the differences from the content delivery system 10.

Like the content delivery system 10, the content delivery system 10c is roughly made up of one content delivery device 100c and n content reception devices $200c_1$, $200c_2$, ..., $200c_i$, ..., $200c_n$. The content delivery device 100c is connected to each of the content reception devices $200c_1$, $200c_2$, ..., $200c_n$ via the Internet 20.

3.1. Construction of the Content Delivery Device 100c

The content delivery device 100c has a similar construction to the content delivery device 100. In detail, the content delivery device 100c includes the send/receive unit 101, the content key generation unit 102, the content encryption unit 103, the public key storage unit 104, a key information generation unit 105c, the content storage unit 106, and the control unit 107. The control unit 107 is connected to the input unit 108 and the display unit 109 (not illustrated).

Which is to say, the content delivery device 100c differs from the content delivery device 100 in that the key information generation unit 105 is replaced with the key information generation unit 105c.

The following description focuses on the differences from the content delivery device 100.

(1) Key Information Generation Unit 105c

Figure 12:
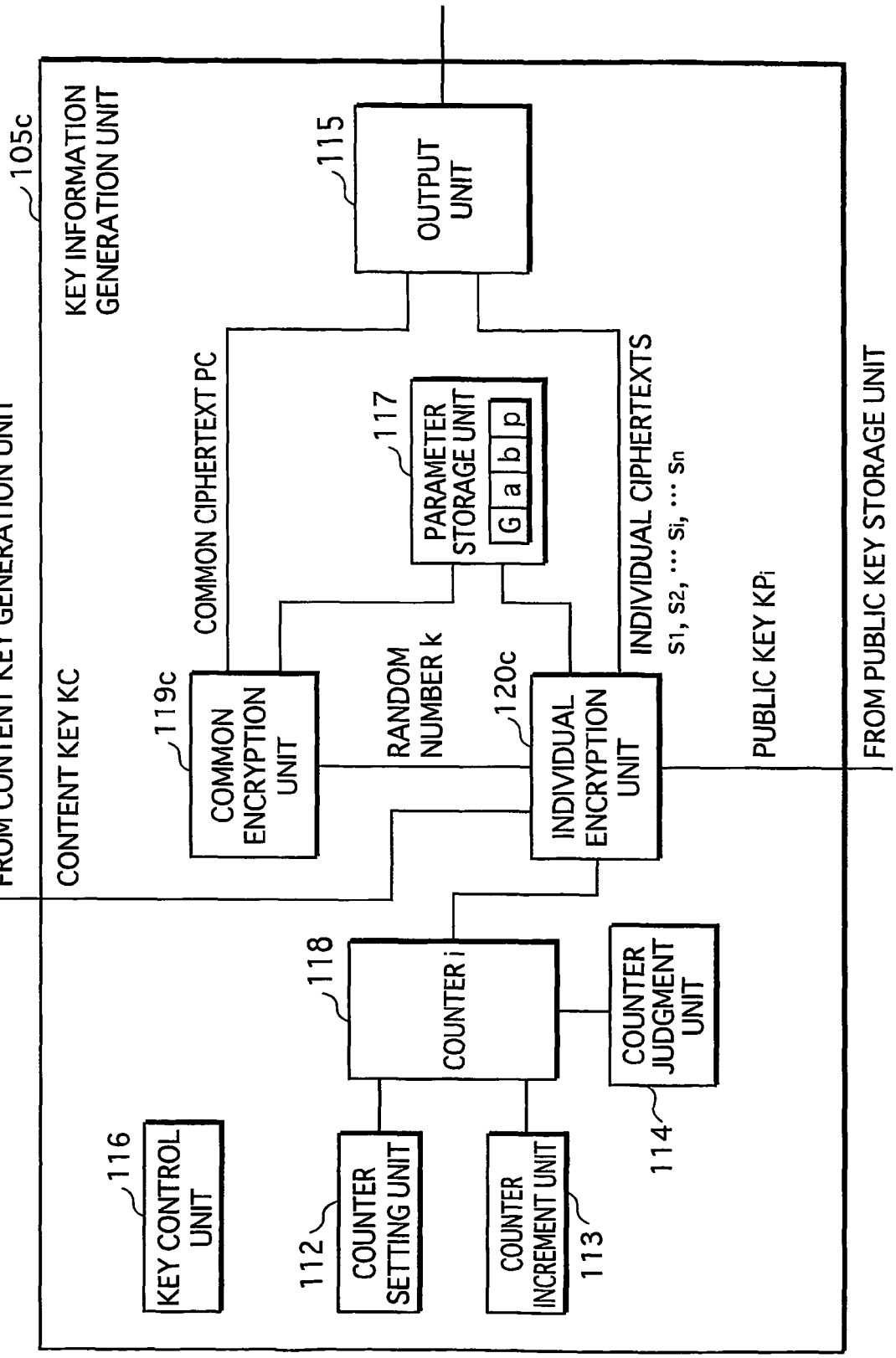
FIG. 12 is a block diagram showing a construction of a key information generation unit in a content delivery device of the third embodiment of the present invention.

The key information generation unit 105c has a similar construction to the key information generation unit 105. FIG. 12 shows the construction of the key information generation unit 105c. As shown in the drawing, the key information generation unit 105c includes the counter setting unit 112, the counter increment unit 113, the counter judgment unit 114, the output unit 115, the key control unit 116, the parameter storage unit 117, the counter 118, a common encryption unit 119c, and an individual encryption unit 120c.

Which is to say, the key information generation unit 105c differs from the key information generation unit 105 in that the key encryption unit 111 is replaced with the common encryption unit 119c and the individual encryption unit 120c. The following description focuses on the differences from the key information generation unit 105.

(Counter Setting Unit 112)

The counter setting unit 112 sets counter i to 1.

(Common Encryption Unit 119c)

The common encryption unit 119c generates 160-bit random number k. The common encryption unit 119c also reads base point G, constant a, and prime p from the parameter storage unit 117, and calculates common ciphertext $$PC=k*G,$$

using random number k, base point G, constant a, and prime p. The common encryption unit 119c outputs common ciphertext PC to the output unit 115, and random number k to the individual encryption unit 120c.

(Individual Encryption Unit 120c)

The individual encryption unit 120c generates individual ciphertext $s_i$ corresponding to the content reception device $200c_i$, in the following way.

(a) Receive random number k from the common encryption unit 119c.

(b) Read public key $KP_i$ from the public key storage unit 104 and constant a and prime p from the parameter storage unit 117, and calculate $$k*KP_i$$

using random number k, public key $KP_i$, constant a, and prime p.

(c) Receive content key KC from the content key generation unit 102, and calculate individual ciphertext $$s_i=KC \text{ xor } x(k*KP_i),$$

for $k*KP_i$, using received content key KC. Here, $x(k*KP_i)$ is the x coordinate of $k*KP_i$.

(d) Output individual ciphertext $s_i$ to the output unit 115.

(Counter Judgment Unit 114, Counter Increment Unit 113, Output Unit 115, and Key Control Unit 116)

The counter judgment unit 114 judges whether counter i is n.

The counter increment unit 113 increments counter i by 1, when the counter judgment unit 114 judges that i≠n. Following this, the above procedure is repeated.

The output unit 115 outputs common ciphertext PC and individual ciphertexts $s_1, s_2, s_3, ..., s_n$ to the send/receive unit 101 as encrypted content key information EKC, when the counter judgment unit 114 judges that i=n.

The key control unit 116 controls the construction elements in the key information generation unit 105c.

(2) Send/Receive Unit 101

The send/receive unit 101 receives encrypted content EC from the content encryption unit 103, and encrypted content key information EKC from the key information generation unit 105c. The send/receive unit 101 transmits encrypted content EC and encrypted content key information EKC to each of the content reception devices $200c_1, 200c_2, \ldots, 200c_n$ via the Internet 20.

Figure 13:
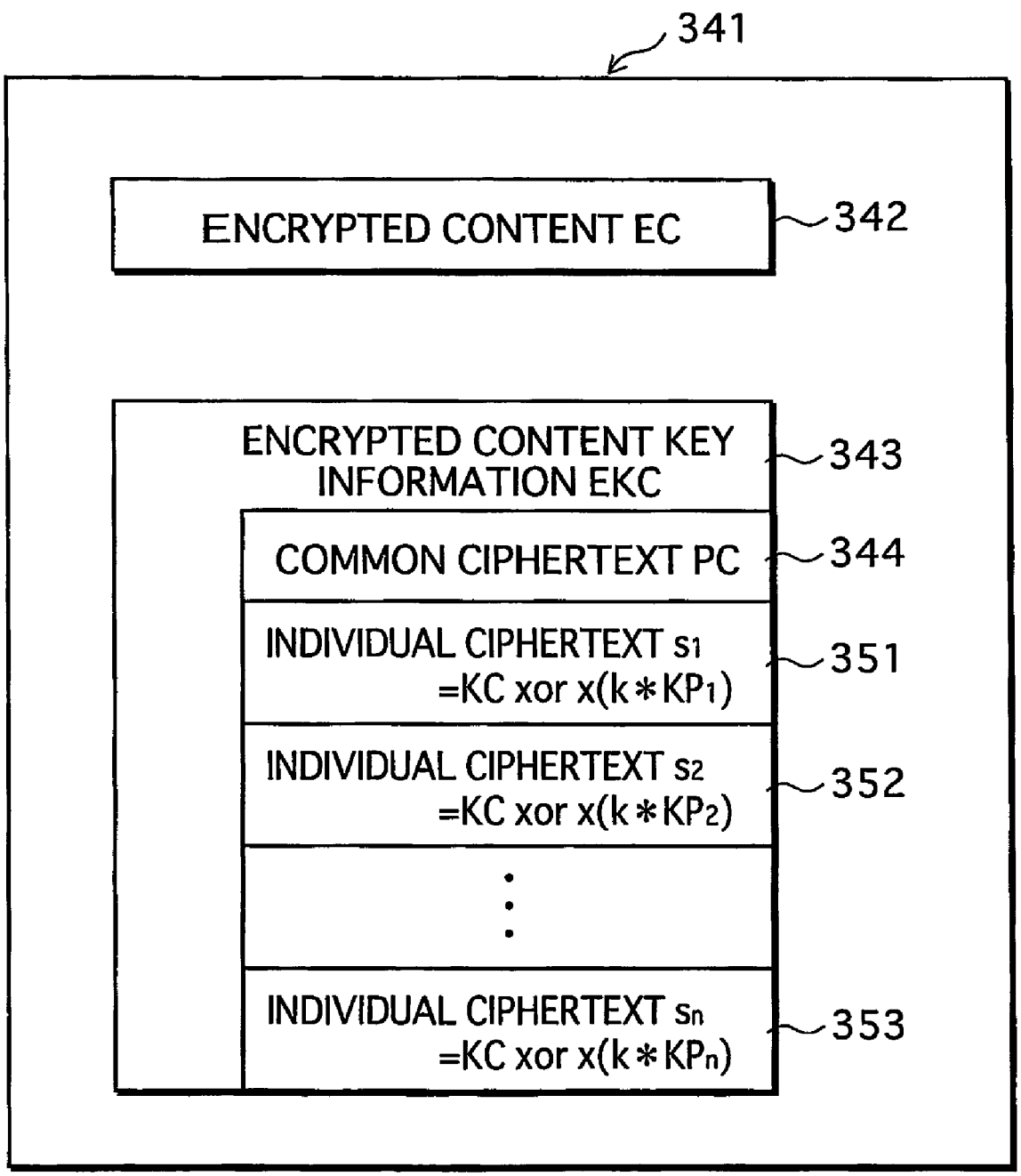
FIG. 13 shows a data structure of transmission information which is transmitted from the send/receive unit in the content delivery device to each content reception device in the third embodiment.

FIG. 13 shows a data structure of transmission information 341 that is transmitted from the send/receive unit 101 to each of the content reception devices $200c_1, 200c_2, \ldots, 200c_n$.

As illustrated, the transmission information 341 is composed of encrypted content EC 342 and encrypted content key information EKC 343. The encrypted content key information EKC 343 is made up of common ciphertext PC 344 and n individual ciphertexts 351, 352, . . . , 353. The ith individual ciphertext, i.e. $s_i$, is KC xor $x(k*KP_i)$.

3.2. Construction of the Content Reception Devices $200c_1, 200c_2, \ldots, 200c_n$ The content reception devices $200c_1, 200c_2, \ldots, 200c_n$ have a similar construction to the content reception devices $200_1, 200_2, \ldots, 200_n$.

The construction of the content reception device $200c_i$ is explained below as a representative example of the content reception devices $200c_1, 200c_2, \ldots, 200c_n$, focusing on the differences from the content reception device $200_i$.

The content reception device $200c_i$ has a similar construction to the content reception device $200_i$. In detail, the content reception device $200c_i$ includes the send/receive unit 201, the secret key storage unit 202, the content decryption unit 203, a key decryption unit 204c, the playback unit 205, the control unit 206, the input unit 207, the monitor 208, the speaker 209, and the parameter storage unit 210 (not illustrated).

Which is to say, the content reception device $200c_i$ differs from the content reception device $200_i$ in that the key decryption unit 204 is replaced with the key decryption unit 204c.

(1) Send/Receive Unit 201

The send/receive unit 201 receives encrypted content EC and encrypted content key information EKC from the content delivery device 100c via the Internet 20, and outputs encrypted content EC to the content decryption unit 203 and encrypted content key information EKC to the key decryption unit 204c.

(2) Key Decryption Unit 204c

Figure 14:
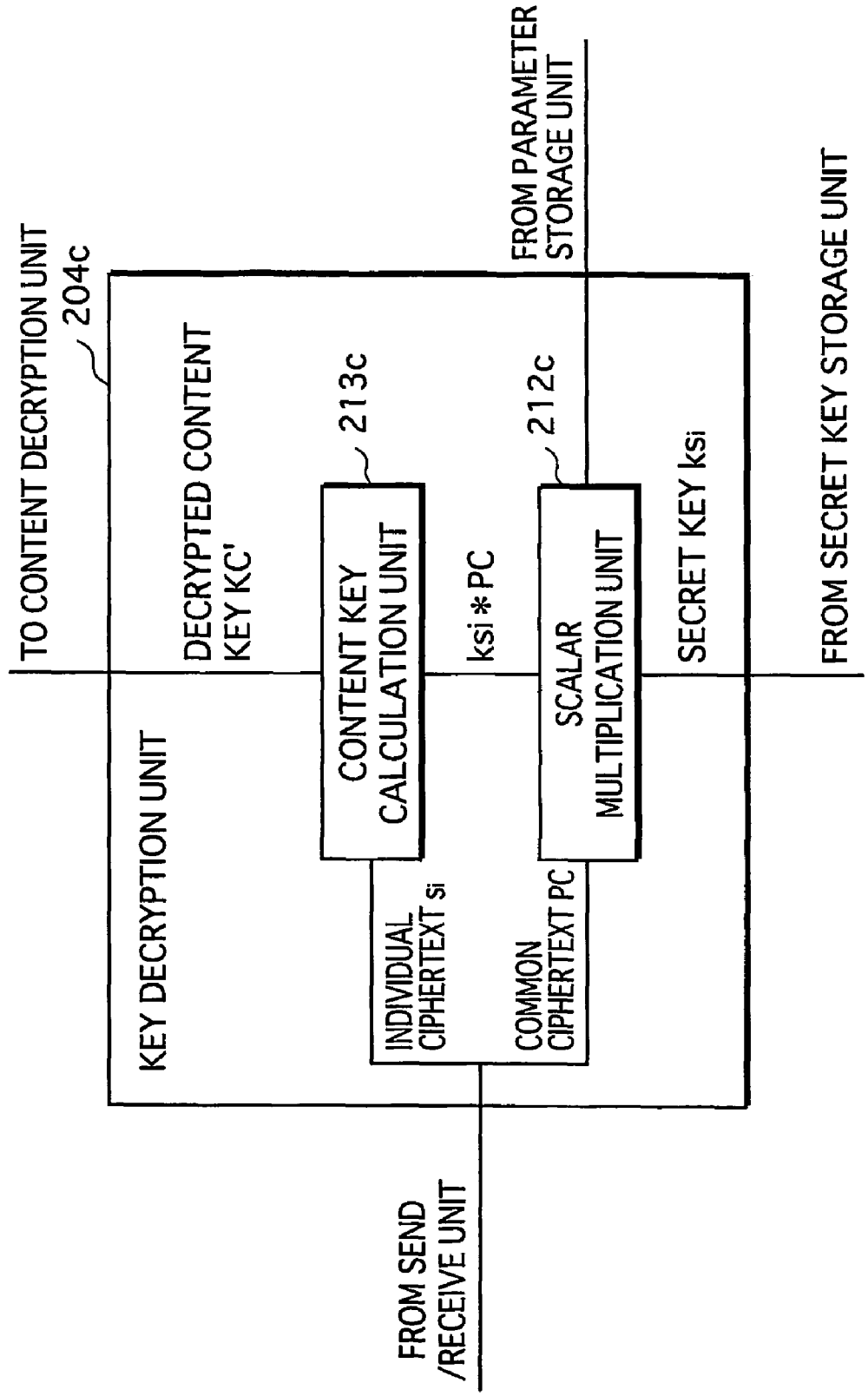
FIG. 14 is a block diagram showing a construction of a key decryption unit in a content reception device of the third embodiment.

FIG. 14 shows a construction of the key decryption unit 204c. As illustrated, the key decryption unit 204c includes a scalar multiplication unit 212c and a content key calculation unit 213c.

The scalar multiplication unit 212c reads secret key $ks_i$ from the secret key storage unit 202. The scalar multiplication unit 212c extracts common ciphertext PC from encrypted content key information EKC received from the send/receive unit 201. The scalar multiplication unit 212c also reads constant a and prime p from the parameter storage unit 210, and calculates point $$ks_i*PC,$$

by multiplying PC by $ks_i$ using constant a, prime p, and secret key $ks_i$. The scalar multiplication unit 212c outputs point $ks_i*PC$ to the content key calculation unit 213c.

The content key calculation unit 213c stores the device ID number "i" assigned to the content reception device $200c_i$, beforehand. The content key calculation unit 213c reads the device ID number "i", and specifies individual ciphertext $s_i$ corresponding to the content reception device $200c_i$ in encrypted content key information EKC received from the send/receive unit 201, using the device ID number "i". The content key calculation unit 213c extracts $s_i$ from encrypted content key information EKC. The content key calculation unit 213c also receives point $ks_i*PC$ from the scalar multiplication unit 212c. The content key calculation unit 213c then calculates $$s_i \text{ xor } x(ks_i*PC),$$

using received point $ks_i*PC$, and sets the calculation result as decrypted content key KC', where $$KC' = s_i \text{ xor } x(ks_i*PC).$$

The content key calculation unit 213c outputs decrypted content key KC' to the content decryption unit 203.

2.3. Operations of the Content Delivery System 10c

The following describes operations of the content delivery system 10c.

The operations of the content delivery system 10c are similar to those of the content delivery system 10, so that the following description focuses on the differences from the content delivery system 10.

An overall operation of the content delivery system 10c is the same as that shown in FIG. 5, and so its explanation has been omitted here.

(1) Operation of Generating Encrypted Content Key Information EKC

Figure 15:
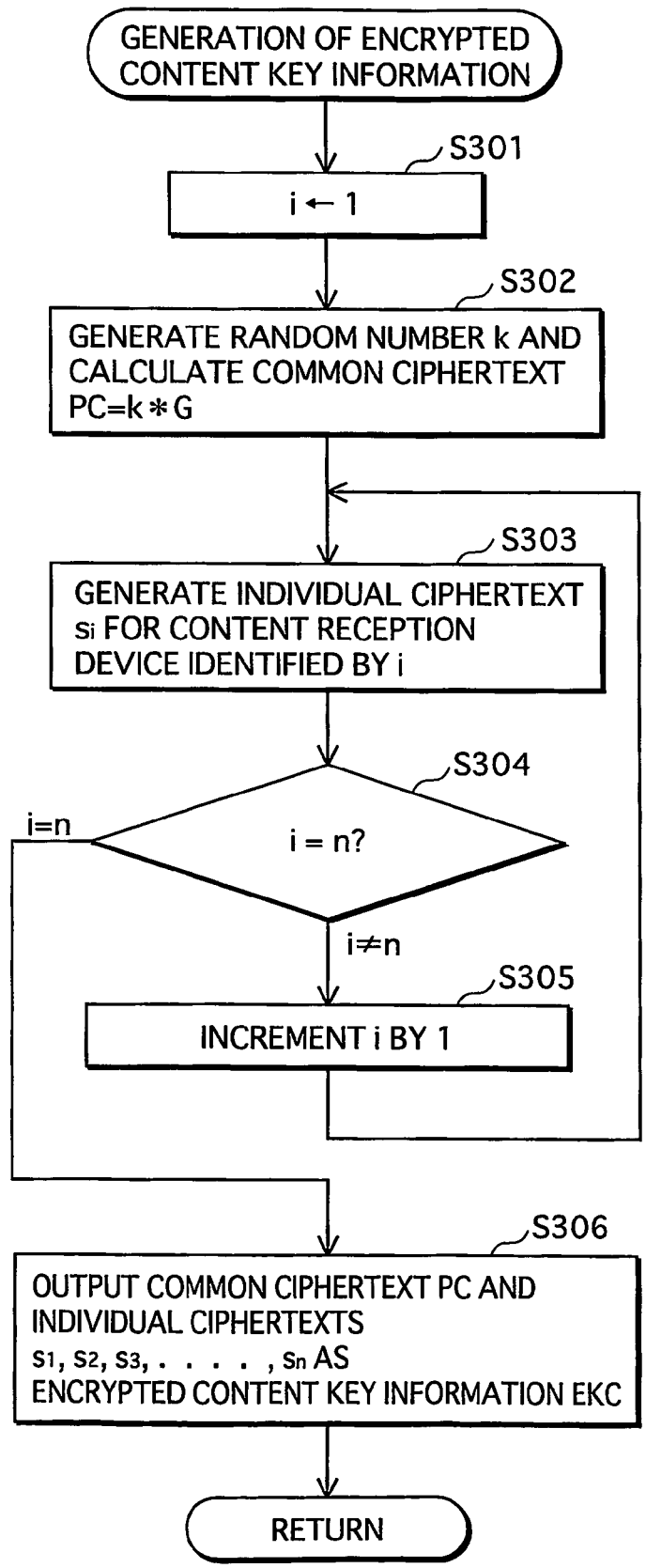
FIG. 15 is a flowchart showing an operation of generating encrypted content key information EKC by the key information generation unit shown in FIG. 12.

FIG. 15 is a flowchart showing an operation of generating encrypted content key information EKC by the key information generation unit 105c in the content delivery device 100c. This operation corresponds to step S103 in FIG. 5.

The counter setting unit 112 sets counter i to 1 (S301).

The common encryption unit 119c generates 160-bit random number k, and calculates common ciphertext PC=k*G. The common encryption unit 119c outputs common ciphertext PC to the output unit 115, and random number k to the individual encryption unit 120c (S302).

The individual encryption unit 120c generates individual ciphertext $s_i$ corresponding to the content reception device $200c_i$, and outputs individual ciphertext $s_i$ to the output unit 115 (S303).

The counter judgment unit 114 judges whether counter i is n (S304). If i≠n, the counter increment unit 113 increments counter i by 1 (S305). The operation then returns to step S303.

If i=n, the output unit 115 outputs common ciphertext PC and individual ciphertexts $s_1, s_2, s_3, \ldots, s_n$ to the send/receive unit 101 as encrypted content key information EKC (S306).

(2) Operation of Generating Decrypted Content Key KC'

Figure 16:
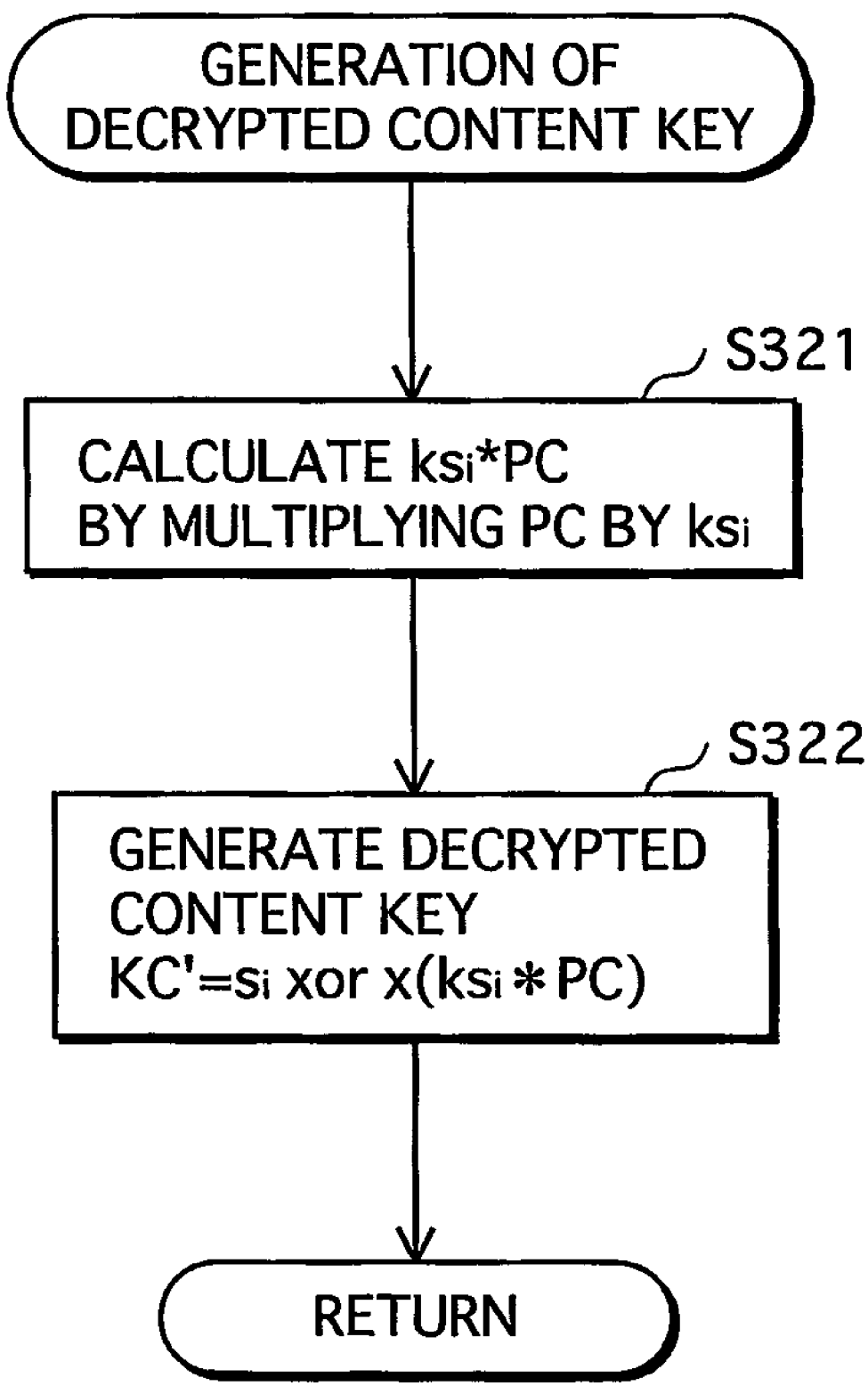
FIG. 16 is a flowchart showing an operation of generating decrypted content key KC' by the key decryption unit shown in FIG. 14.

FIG. 16 is a flowchart showing an operation of generating decrypted content key KC' by the key decryption unit 204c in the content reception device $200c_i$. This operation corresponds to step S105 in FIG. 5.

The scalar multiplication unit 212c calculates point $ks_i*PC$ by multiplying common ciphertext PC by secret key $ks_i$, using constant a, prime p, and secret key $ks_i$. The scalar multiplication unit 212c outputs point $ks_i*PC$ to the content key calculation unit 213c (S321).

The content key calculation unit 213c calculates decrypted content key KC'=$s_i$ xor x ($ks_i*PC$), and outputs decrypted content key KC' to the content decryption unit 203 (S322).

3.4. Effects of the Third Embodiment

The following examines the data size of encrypted content key information EKC in the content delivery system 10c.

For simplicity's sake, field of definition GF(p) of elliptic curve $E_1$ is assumed to be 160 bits that is currently recommended in elliptic curve cryptography.

Common ciphertext PC is a point on elliptic curve $E_1$. PC is made up of x and y coordinates that are each 160 bits long, and therefore is 320 bits (=40 bytes). Individual ciphertext $s_i$ is 160 bits (=20 bytes).

Suppose n=1,000,000. According to the third embodiment, the data size of encrypted content key information EKC is 40+20×1,000,000=20,000,040 bytes (≈20 megabytes).

According to the conventional technique, meanwhile, the data size of encrypted content key information is 80 megabytes. Thus, the content delivery system $10c$ of the third embodiment enables the data size of encrypted content key information to be reduced by ¼, when compared with that of the conventional technique.

3.5. Conclusion on the Third Embodiment

According to this embodiment, the present invention can be realized by an information transfer system which includes an encryption device and a plurality of decryption devices and transfers information in secrecy.

The encryption device includes a storage unit, a common calculation unit, an individual calculation unit, and an output unit. The storage unit stores a plaintext. The common calculation unit generates a common ciphertext that is common to the plurality of decryption devices. The individual calculation unit separately generates a plurality of individual ciphertexts corresponding to the plurality of decryption devices, based on the plaintext. The output unit outputs the common ciphertext and the plurality of individual ciphertexts.

Each of the plurality of decryption devices includes an acquisition unit, an extraction unit, and a decryption unit. The acquisition unit acquires the common ciphertext and the plurality of individual ciphertexts. The extraction unit extracts an individual ciphertext corresponding to the decryption device, from the plurality of individual ciphertexts. The decryption unit generates a decrypted text using the common ciphertext and the extracted individual ciphertext.

The present invention can also be realized by an information transfer system which includes an encryption device and a plurality of decryption devices, and transfers information in secrecy using a discrete logarithm problem on a group as a basis for security.

Let g be a base element of the group. A public key of each of the plurality of decryption devices is calculated by applying, (ks−1) times, a group operation to the base element g, where ks is a secret key of the decryption device.

The encryption device includes a storage unit, a random number generation unit, a common calculation unit, an individual calculation unit which includes a public key calculation unit and an exclusive-OR unit, and an output unit. The storage unit stores a plaintext. The random number generation unit generates a random number k which is a scalar. The common calculation unit applies, (k−1) times, the group operation to the base element g, to generate a common ciphertext element. The public key calculation unit applies, (k−1) times, the group operation to the public key of each of the plurality of decryption devices, to generate a plurality of group-operated public key elements corresponding to the plurality of decryption devices. The exclusive-OR unit performs an exclusive-OR operation on the plaintext and each of the plurality of group-operated public key elements, to generate a plurality of individual ciphertexts corresponding to the plurality of decryption devices. The output unit outputs the common ciphertext element and the plurality of individual ciphertexts.

Each of the plurality of decryption devices includes an acquisition unit, an extraction unit, a secret key calculation unit, and an exclusive-OR unit. The acquisition unit acquires the common ciphertext element and the plurality of individual ciphertexts. The extraction unit extracts an individual ciphertext corresponding to the decryption device from the plurality of individual ciphertexts. The secret key calculation unit applies, (ks−1) times, the group operation to the common ciphertext element where ks is a secret key of the decryption device. The exclusive-OR unit performs an exclusive-OR operation on the extracted individual ciphertext and the group-operated common ciphertext element, to generate a decrypted text.

The present invention can also be realized by an information transfer system which includes an encryption device and a plurality of decryption devices, and transfers information in secrecy using an elliptic curve discrete logarithm problem as a basis for security.

Let an elliptic curve be defined over a finite field GF(p) by an equation $$y^2 = x^3 + a \times x + b,$$

with p being a prime and G being a base point on the elliptic curve. This being so, a public key point of each of the plurality of decryption devices is calculated by multiplying the base point G by a secret key of the decryption device, on the elliptic curve.

The encryption device includes a storage unit, a random number generation unit, a common calculation unit, an individual calculation unit which includes a public key calculation unit and an exclusive-OR unit, and an output unit. The storage unit stores a plaintext. The random number generation unit generates a random number which is a scalar. The common calculation unit multiplies the base point G by the random number to generate a common ciphertext point. The public key calculation unit multiplies the public key point of each of the plurality of decryption devices by the random number, to generate a plurality of multiplied public key points corresponding to the plurality of decryption devices. The exclusive-OR unit performs an exclusive-OR operation on the plaintext and an x coordinate of each of the plurality of multiplied public key points, to generate a plurality of individual ciphertexts corresponding to the plurality of decryption devices. The output unit outputs the common ciphertext point and the plurality of individual ciphertexts.

Each of the plurality of decryption devices includes an acquisition unit, an extraction unit, a secret key calculation unit, and an exclusive-OR unit. The acquisition unit acquires the common ciphertext point and the plurality of individual ciphertexts. The extraction unit extracts an individual ciphertext corresponding to the decryption device, from the plurality of individual ciphertexts. The secret key calculation unit multiplies the common ciphertext point by a secret key of the decryption device. The exclusive-OR unit performs an exclusive-OR operation on the extracted individual ciphertext and an x coordinate of the multiplied common ciphertext point, to generate a decrypted text.

According to these constructions, the data size of the transferred ciphertext is reduced by making part of the ciphertext common to all decryption devices. This contributes to high practicality.

4. Conclusion on the First to Third Embodiments

As described above, the present invention can be realized by a content delivery system which includes a content delivery device, a communication path, and a plurality of content reception devices, and delivers content from the content delivery, devise to each of the plurality of content reception devices via the communication path.

The content delivery device includes: a transmission unit which transmits data to each of the plurality of content reception devices; a content key generation unit which generates a content key; an encrypted content generation unit which encrypts the content using the content key; a public key storage unit which stores a public key of each of the plurality of content reception devices; and an encrypted content key information generation unit which encrypts the content key using the public key to generate encrypted content key information.

Each of the plurality of content reception devices includes: a reception unit which receives data from the content delivery device; a secret key storage unit which stores a secret key of the content reception device; an encrypted content key decryption unit which decrypts the encrypted content key information to obtain the content key; and an encrypted content decryption unit which decrypts the encrypted content to obtain the content.

The encrypted content key information generation unit performs elliptic curve encryption, and generates the encrypted content key information that includes: an x coordinate of an elliptic curve point PC included in a ciphertext obtained by the elliptic curve encryption; and remaining parts the ciphertext other than the elliptic curve point PC. The encrypted content key decryption unit calculates a y coordinate of the elliptic curve point PC whose x coordinate is included in the encrypted content key information.

Here, the elliptic curve encryption may be performed using an elliptic curve defined by $$y^2 = x^3 + a \times x + b,$$

where a and b are integers. In this case, the encrypted content key decryption unit calculates the y coordinate of the elliptic curve point PC by finding a square root of $$(PCx)^3 + a \times PCx + b,$$

where PCx denotes the x coordinate of the elliptic curve point PC.

The present invention can also be realized by a content delivery system which includes a content delivery device, a communication path, and a plurality of content reception devices, and delivers content from the content delivery device to each of the plurality of content reception devices via the communication path.

The content delivery device includes: a transmission unit which transmits data to each of the plurality of content reception devices; a content key generation unit which generates a content key; an encrypted content generation unit which encrypts the content using the content key; a public key storage unit which stores a public key of each of the plurality of content reception devices; and an encrypted content key information generation unit which encrypts the content key using the public key to generate encrypted content key information.

Each of the plurality of content reception devices includes: a reception unit which receives data from the content delivery device; a secret key storage unit which stores a secret key of the content reception device; an encrypted content key decryption unit which decrypts the encrypted content key information to obtain the content key; and an encrypted content decryption unit which decrypts the encrypted content to obtain the content.

The encrypted content key information generation unit generates a common ciphertext which is common to the plurality of content reception devices and a plurality of individual ciphertexts corresponding separately to the plurality of content reception devices, as the encrypted content key information.

Here, the encrypted content key information generation unit and the encrypted content key decryption unit may use elliptic curve cryptography.

Here, the common ciphertext and the plurality of individual ciphertexts may each be a point on an elliptic curve. Alternatively, the common ciphertext may be a point on an elliptic curve and each of the plurality of individual ciphertexts may be an element in a field of definition of the elliptic curve.

Here, the encrypted content key information generation unit and the encrypted content key decryption unit may use an ElGamal cipher.

The present invention can also be realized by a content delivery device in a content delivery system which includes the content delivery device, a communication path, and a plurality of content reception devices, and delivers content from the content delivery device to each of the plurality of content reception devices via the communication path.

The content delivery device includes: a transmission unit which transmits data to each of the plurality of content reception devices; a content key generation unit which generates a content key; an encrypted content generation unit which encrypts the content using the content key; a public key storage unit which stores a public key of each of the plurality of content reception devices; and an encrypted content key information generation unit which encrypts the content key using the public key to generate encrypted content key information.

The encrypted content key information generation unit performs elliptic curve encryption, and generates the encrypted content key information that includes: an x coordinate of an elliptic curve point included in a ciphertext obtained by the elliptic curve encryption; and remaining parts of the ciphertext other than the elliptic curve point.

The present invention can also be realized by a content reception device in a content delivery system which includes a content delivery device, a communication path, and a plurality of content reception devices, and delivers content from the content delivery device to each of the plurality of content reception devices via the communication path.

The content reception device includes: a reception unit which receives data from the content delivery device; a secret key storage unit which stores a secret key of the content reception device; an encrypted content key decryption unit which decrypts encrypted content key information to obtain a content key; and an encrypted content decryption unit which decrypts encrypted content to obtain the content.

The encrypted content key decryption unit calculates a y coordinate of an elliptic curve point whose x coordinate is included in the encrypted content key information.

The present invention can also be realized by a content delivery device in a content delivery system which includes the content delivery device, a communication path, and a plurality of content reception devices, and delivers content from the content delivery device to each of the plurality of content reception devices via the communication path.

The content delivery device includes: a transmission unit which transmits data to each of the plurality of content reception devices; a content key generation unit which generates a content key; an encrypted content generation unit which encrypts the content using the content key; a public key storage unit which stores a public key of each of the plurality of content reception devices; and an encrypted content key information generation unit which encrypts the content key using the public key to generate encrypted content key information.

The encrypted content key information generation unit generates a common ciphertext that is common to the plurality of content reception devices and a plurality of individual ciphertexts corresponding separately to the plurality of content reception devices, as the encrypted content key information.

The present invention can also be realized by a content reception device in a content delivery system which includes a content delivery device, a communication path, and a plurality of content reception devices, and delivers content from the content delivery device to each of the plurality of content reception devices via the communication path.

The content reception device includes: a reception unit which receives data from the content delivery device; a secret key storage unit which stores a secret key of the content reception device; an encrypted content key decryption unit which decrypts encrypted content key information to obtain a content key; and an encrypted content decryption unit which decrypts encrypted content to obtain the content.

The encrypted content key decryption unit obtains the content key from a common ciphertext and an individual ciphertext included in the encrypted content key information. Here, the common ciphertext is common to the plurality of content reception devices, whereas the individual ciphertext corresponds to the content reception device.

According to these constructions, the data size of encrypted content key information can be reduced by omitting a y coordinate of an elliptic curve point included in a ciphertext or by making part of the ciphertext common to the plurality of content reception devices. This contributes to high practicality.

5. Modifications

The present invention has been described by way of the above first to third embodiments, though it should be obvious that the present invention is not limited to the above. Example modifications are given below.

(1) The first embodiment describes the case where encrypted content key $EKC_i$ generated by the key encryption unit 111 in the key information generation unit 105 in the content delivery device 100 is made up of $x(PC_i)$ (the x coordinate of point $PC_i$) and point $C_i$. As an alternative, encrypted content key $EKC_i$ may be made up of point $PC_i$ and $x(C_i)$ (the x coordinate of point $C_i$).

In this case, the key encryption unit 111 generates encrypted content key $EKC_i$ in the following manner.

(a) Generate 160-bit random number $k_i$.

(b) Read base point G, constant a, and prime p from the parameter storage unit 117, and calculate $$k_i*G,$$

using random number $k_i$, base point G, constant a, and prime p. Elliptic curve point multiplication is as described earlier.

(c) Read public key $KP_i$ from the public key storage unit 104, and calculate $$k_i*KP_i,$$

using random number $k_i$, public key $KP_i$, constant a, and prime p.

(d) Receive content key KC from the content key generation unit 102, and convert content key KC to point $P\_KC=f(KC)$ on elliptic curve $E_1$ using conversion function f described earlier.

(e) Calculate $$C_i = P\_KC + k_i*KP_i.$$

(f) Judge whether $y(C_i)$ (the y coordinate of point $C_i$) satisfies $$y(C_i) < (p-1)/2, \text{ wherein}$$

if $y(C_i) < (p-1)/2$, then set $PC_i = k_i*G$, and if $y(C_i) \geqq (p-1)/2$, then set $PC_i = -k_i*G$.

(g) Output $x(C_i)$ (the x coordinate of point $C_i$) and point $PC_i$ to the output unit 115 as encrypted content key $EKC_i$.

In the content reception device $200_i$, the square root calculation unit 211 in the key decryption unit 204 calculates two square roots rt of $$x(C_i)^3 + a \times x(C_i) + b,$$

for $x(C_i)$ which is included in encrypted content key $EKC_i$. The square root calculation unit 211 selects square root rt, out of two square roots rt, that satisfies $rt < (p-1)/2$. The square root calculation unit 211 then generates $C_i' = (x(C_i), rt)$.

Following this, the scalar multiplication unit 212 calculates point $$ks_i*PC_i,$$

by multiplying $PC_i$ by $ks_i$.

After this, the content key calculation unit 213 calculates $$P\_KC' = C_i' - ks_i*PC_i.$$

The content key calculation unit 213 then converts $P\_KC'$ to an integer to thereby generate decrypted content key $KC' = f^{-1}(P\_KC')$.

Such decrypted content key KC' is expected to be equal to content key KC.

(2) The third embodiment describes the case where the individual encryption unit 120c generates individual ciphertext $s_i = KC$ xor $x(k*KP_i)$ which is a scalar. Instead, the individual encryption unit 120c may generate individual ciphertext $C_i$ which is a point on elliptic curve $E_1$, as in the first embodiment.

(3) The first to third embodiments describe the case where elliptic curve $E_1$ defined over GF(p) is used, but elliptic curve $E_2$ defined over $GF(p^m)$, e.g. $GF(2^m)$, may instead be used.

Let elliptic curve $E_2$ be defined by an equation of the form $$y^2 + xy = x^3 + ax^2 + b.$$

Also, a corresponding negative point of point P(x,y) on elliptic curve $E_2$ is denoted by $-P(x,x+y)$, and a generator polynomial of $GF(2^m)$ is denoted by f(x) whose root is α.

This being the case, the key information generation unit 105 in the content delivery device 100 generates encrypted content key information EKC in the following way, as one example.

The key encryption unit 111 generates encrypted content key $EKC_i$ as follows.

(a) Generate 160-bit random number $k_i$.

(b) Read base point G, constant a, and prime p from the parameter storage unit 117, and calculate $$PC_i = k_i*G,$$

using random number $k_i$, base point G, constant a, and prime p.

(c) Read public key $KP_i$ from the public key storage unit 104, and calculate $$k_i*KP_i,$$

using random number $k_i$, public key $KP_i$, constant a, and prime p.

(d) Receive content key KC from the content key generation unit 102, and convert content key KC to point P_KC=f(KC) on elliptic curve $E_2$ using conversion function f.

(e) Calculate $P\_KC+k_i^*KP_i$.

(f) Find s which is the lowest degree of $\alpha$ among terms whose coefficients are not 0 but 1, in a polynomial of $x(PC_i)$ (the x coordinate of $PC_i$) by $\alpha$.

For example, when $x(PC_i)=\alpha^6+\alpha^5=\alpha^3$, s=3 because term $\alpha^3$ has a nonzero coefficient and a lowest degree.

(g) If a coefficient of term $\alpha^s$ in a polynomial of $y(PC_i)$ (the y coordinate of $PC_i$) by $\alpha$ is equal to the coefficient of term $\alpha^s$ in the polynomial of $x(PC_i)$ by $\alpha$, then set $$C_i=P\_KC+k_i^*KP_i, \text{ and}$$

if, on the other hand, the coefficient of term $\alpha^s$ in the polynomial of $y(PC_i)$ by $\alpha$ is not equal to the coefficient of term $\alpha^s$ in the polynomial of $x(PC_i)$ by $\alpha$, set $$C_i=-(P\_KC+k_i^*KP_i).$$

(h) Output $x(PC_i)$ (the x coordinate of point $PC_i$) and point $C_i$ to the output unit 115 as encrypted content key $EKC_i$.

The output unit 115 outputs encrypted content keys $EKC_1$, $EKC_2$, $EKC_3$, ..., $EKC_n$ to the send/receive unit 101 as encrypted content key information EKC.

The send/receive unit 101 transmits encrypted content EC and encrypted content key information EKC to each of the content reception devices $200_1$, $200_2$, ..., $200_n$ via the Internet 20.

The content reception device $200_i$ receives encrypted content EC and encrypted content key information EKC from the content delivery device 100 via the internet 20.

In the content reception device $200_i$, the key decryption unit 204 stores the device ID number "i" assigned to the content reception device $200_i$, beforehand.

The key decryption unit 204 receives encrypted content key information EKC from the send/receive unit 201, and reads the device ID number "i". The key decryption unit 204 specifies encrypted content key $EKC_i$ corresponding to the content reception device $200_i$ in encrypted content key information EKC using the device ID number "i", as described earlier. The key decryption unit 204 extracts encrypted content key $EKC_i$ from encrypted content key information EKC, and further extracts $x(PC_i)$ (the x coordinate of point $PC_i$) and point $C_i$ from encrypted content key $EKC_i$.

The key decryption unit 204 finds lowest degree s of $\alpha$ among terms whose coefficients are not 0 but 1, in the polynomial of $x(PC_i)$ by $\alpha$. The key decryption unit 204 then computes $$y^2+x(PC_i)y=x(PC_i)^3+a\times x(PC_i)^2+b,$$

to obtain two solutions $y_{i-1}'$ and $y_{i-2}'$. The key decryption unit 204 selects one solution, out of two solutions $y_{i-1}'$ and $y_{i-2}'$, whose polynomial by $\alpha$ contains term $\alpha^s$ having an equal coefficient to term $\alpha^s$ in the polynomial of $x(PC_i)$ by $\alpha$. Hence solution $y(PC_i)'$ is selected.

Following this, the key decryption unit 204 sets $$PC_i'=(x(PC_i),y(PC_i)'),$$

using selected $y(PC_i)'$ and extracted $x(PC_i)$. The key decryption unit 204 then calculates $$P\_KC'=C_i-ks_i^*PC_i'$$

and converts P_KC' to an integer to thereby generate decrypted content key $KC'=f^{-1}(P\_KC')$.

The content decryption unit 203 decrypts encrypted content EC using such decrypted content key KC', to generate decrypted content C'.

The above modification can further be modified as follows.

The above modification describes the case where s is the lowest degree of $\alpha$ among terms whose coefficients are not 0 but 1. Alternatively, s may be the highest degree of $\alpha$ among terms whose coefficients are not 0 but 1.

Also, the above modification describes an example of selecting one of two solutions and $y_{i-1}'$ and $y_{i-2}'$ whose polynomial by $\alpha$ contains term $\alpha^s$ having an equal coefficient to term $\alpha^s$ in the polynomial of $x(PC_i)$ by $\alpha$. Alternatively, one of two solutions and $y_{i-1}'$ and $y_{i-2}'$ whose polynomial by $\alpha$ contains term $\alpha^s$ having an unequal coefficient to term $\alpha^s$ in the polynomial of $x(PC_i)$ by $\alpha$ may be selected.

(4) The third embodiment describes the case where ElGamal on an elliptic curve is used, but ElGamal on a finite field may instead be used.

One example of the use of finite field ElGamal is given below.

Let p be a prime, g be a base element on finite field GF(p) (g∈GP(p)), and q be an order of base element g (where $g^q=1$ mod p).

Also, $ks_i$ denotes a secret key of the content reception device $200c_i$, and $kp_i$ denotes a public key of the content reception device $200c_i$ ($kp_i=g^{ksi}$ mod p).

Here, $a^b$ denotes exponentiation where a is raised to the power of b.

The content reception device $200c_i$ stores secret key $ks_i$, prime p, base element g, and order q of base element g. The content delivery device 100c stores public keys $kp_1$, $kp_2$, ..., $kp_n$, prime p, base element g, and order q of base element g.

In the content delivery device 100c, the common encryption unit 119c generates 160-bit random number k. The common encryption unit 119c also reads base element g and prime p, and calculates common ciphertext $$pc=g^k \bmod p,$$

using random number k, base element g, and prime p. The common encryption unit 119c outputs common ciphertext pc to the output unit 115, and random number k to the individual encryption unit 120c.

The individual encryption unit 120c generates individual ciphertext $c_i$ corresponding to the content reception device $200c_i$, as follows.

(a) Receive random number k from the common encryption unit 119c.

(b) Read public key $kp_i$ and prime p, and calculate $$kp_i^k \bmod p,$$

using random number k, public key $kp_i$, and prime p.

(c) Receive content key KC from the content key generation unit 102, and calculate individual ciphertext $$c_i=KC \, xor(kp_i^k \bmod p),$$

using received content key KC.

In this way, individual ciphertexts $c_i, c_2, \ldots, c_n$ corresponding to the content reception devices $200c_1, 200c_2, \ldots, 200c_n$ are generated.

The transmission unit 101 transmits encrypted content key information EKC that is made up of common ciphertext pc and individual ciphertexts $c_i, c_2, \ldots, c_n$, to each of the content reception devices $200c_1, 200c_2, \ldots, 200c_n$ via the Internet 20.

The content reception device $200c_i$ receives encrypted content key information EKC that is made up of common ciphertext pc and individual ciphertexts $c_i, c_2, \ldots, c_n$, from the content delivery device 100c.

In the content reception device $200c_i$, the key decryption unit 204c includes the scalar multiplication unit 212c and the content key calculation unit 213c, as shown in FIG. 14.

The scalar multiplication unit 212c reads secret key $ks_i$ and prime p. The scalar multiplication unit 212c also extracts common ciphertext pc from encrypted content key information EKC received from the send/receive unit 201. The scalar multiplication unit 212c calculates $$pc^{ksi} \bmod p,$$

using prime p and secret key $ks_i$. The scalar multiplication unit 212c outputs $pc^{ksi} \bmod p$ to the content key calculation unit 213c.

The content key calculation unit 213c stores the device ID number "i" assigned to the content reception device $200c_i$, beforehand. The content key calculation unit 213c reads the device ID number "i". The content key calculation unit 213c specifies individual ciphertext $c_i$ corresponding to the content reception device $200c_i$ in encrypted content key information EKC received from the send/receive unit 201, using the device ID number "i". The content key calculation unit 213c extracts $c_i$ from encrypted content key information EKC. The content key calculation unit 213c also receives $pc^{ksi} \bmod p$ from the scalar multiplication unit 212c, and calculates $$c_i \, xor(pc^{ksi} \bmod p),$$

using received $pc^{ksi} \bmod p$. The content key calculation unit 213c sets the calculation result as decrypted content key KC', wherein $$KC' = c_i \, xor(pc^{ksi} \bmod p).$$

The content key calculation unit 213c outputs decrypted content key KC' to the content decryption unit 203.

According to this modification, the present invention can be realized by an information transfer system which includes an encryption device and a plurality of decryption devices, and transfers information in secrecy using a finite field discrete logarithm problem as a basis for security.

Let p be a prime, g be a base element on a finite field GF(p) (g∈GF(p)), and q be an order of the base element g (where $g^q = 1 \bmod p$).

This being so, a public key kp of each of the plurality of decryption devices is calculated by $$kp = g^{ks} \bmod p,$$

using a secret key ks of the decryption device.

The encryption device includes a storage unit, a random number generation unit, a common calculation unit, an individual calculation unit which includes a public key calculation unit and an exclusive-OR unit, and an output unit. The storage unit stores a plaintext. The random number generation unit generates a random number k. The common calculation unit generates a common ciphertext element pc, wherein $$pc = g^k \bmod p,$$

using the base element g and the random number k. The public key calculation unit calculates an exponentiated public key element $$kp^k \bmod p,$$

using the public key kp of each of the plurality of decryption devices and the random number k. The exclusive-OR unit performs an exclusive-OR operation on the plaintext and the exponentiated public key element calculated for each of the plurality of decryption devices, to obtain a plurality of individual ciphertexts corresponding to the plurality of decryption devices. The output unit outputs the common ciphertext element pc and the plurality of individual ciphertexts.

Each of the plurality of decryption devices includes an acquisition unit, an extraction unit, a secret key calculation unit, and an exclusive-OR unit. The acquisition unit acquires the common ciphertext element pc and the plurality of individual ciphertexts. The extraction unit extracts an individual ciphertext corresponding to the decryption device, from the plurality of individual ciphertexts. The secret key calculation unit calculates an exponentiated common ciphertext element $$pc^{ks} \bmod p,$$

using the common ciphertext element pc and the secret key ks of the decryption device. The exclusive-OR unit performs an exclusive-OR operation on the extracted individual ciphertext and the exponentiated common ciphertext element, to generate a decrypted text.

(5) The first to third embodiments may be freely combined.

(6) The first to third embodiments describe the case where one pair of secret key and public key is assigned to each content reception device, but the present invention is not limited to such.

For example, content may be grouped according to type, such as author, producer, or genre, so that one pair of secret key and public key is assigned to each group.

Also, one pair of secret key and public key may be assigned to each individual user.

Further, one pair of secret key and public key may be assigned to each group of users.

(7) The first to third embodiments describe the case where the content delivery device distributes encrypted content and encrypted content key information via the Internet, but the content delivery device may distribute a storage medium, such as a DVD or a memory card, on which the encrypted content and the encrypted content key information are stored. In this case, each content reception device reads the encrypted content and the encrypted content key information from the storage medium and decrypts the encrypted content.

As an alternative, the content delivery device may broadcast the encrypted content and the encrypted content key information by digital broadcasting. In this case, each content reception device receives a broadcast wave carrying the encrypted content and the encrypted content key information, extracts the encrypted content and the encrypted content key information from the broadcast wave, and decrypts the encrypted content.

(8) The first to third embodiments and modifications describe the case where elliptic curve ElGamal or finite field ElGamal is used to encrypt a content key, but the present invention is not limited to this. Elliptic curve ElGamal or finite field ElGamal may equally be used to encrypt content.

(9) The first to third embodiments describe an example of encrypting content, but this is not a limit for the present invention.

The present invention can be applied to any kind of secret communication for securely communicating information without the communicated content being revealed to third parties. For instance, the present invention is applicable to an e-mail transmission/reception system, a secret communication system for business transaction, a patent application filing system, and a payment system in a financial institution.

(10) The present invention also applies to the method described, above. This method may be realized by a computer-readable program that is executed by a computer. Such a computer-readable program may be distributed as a digital signal.

The present invention may be realized by a computer-readable storage medium, such as a flexible disk, a hard disk, a CD-ROM, an MO, a DVD, a DVD-ROM, a DVD-RAM, a BD (Blu-ray Disc), or a semiconductor memory, on which the above computer-readable program or digital signal is recorded. Conversely, the present invention may also be realized by the computer-readable program or digital signal that is recorded on such a storage medium.

The computer-readable program or digital signal that achieves the present invention may also be transmitted via a network, such as an electronic communications network, a wired or wireless communications network, or the Internet, or via data broadcasting.

The present invention can also be realized by a computer system that includes a microprocessor and a memory. In this case, the computer-readable program can be stored in the memory, with the microprocessor operating in accordance with this computer-readable program.

The computer-readable program or digital signal may be provided to an independent computer system by distributing a storage medium on which the computer-readable program or digital signal is recorded, or by transmitting the computer-readable program or digital signal via a network. The independent computer system may then execute the computer-readable program or digital signal to function as the present invention.

(11) The first to third embodiments and modifications may be freely combined.

As described above, the present invention can reduce the data size of encrypted content key information, by omitting the y coordinate of an elliptic curve point in a ciphertext from each encrypted content key or by making part of the ciphertext common to all content reception devices.

The devices of the present invention can be used recurrently and continuously in any industry that handles information securely and reliably without the information being revealed to third parties. Also, the devices of the present invention can be manufactured and sold recurrently and continuously in a manufacturing industry of electrical products.

The invention claimed is:

1. An information transfer system for transferring information in secrecy using an elliptic curve discrete logarithm problem as a basis for security, the information transfer system comprising an encryption device and a decryption device,
   wherein the encryption device comprises:
      a storage unit storing a plaintext that is a scalar;
      an encryption unit including:
         a random number generation unit operable to generate a random number that is a scalar;
         a first calculation unit operable to multiply a base point on an elliptic curve by the random number, the elliptic curve being defined over a finite field GF(p) by an equation $y^2=x^3+a\times x+b$, where p is a prime;
         a second calculation unit operable to multiply a public key point on the elliptic curve by the random number;
         a conversion unit operable to apply, to the plaintext, a conversion function, which converts a scalar to a corresponding point on the elliptic curve, to generate a plaintext point on the elliptic curve;
         a third calculation unit operable to judge whether a y coordinate of a result of the multiplying of the base point is smaller than $(p-1)/2$, and operable to set, as a sum point, (i) a sum of the plaintext point and a result of the multiplying of the public key point, when the judgment by the third calculation unit is affirmative, and (ii) a corresponding negative point of the sum of the plaintext point and the result of the multiplying of the public key point, when the judgment by the third calculation unit is negative; and
         a generation unit operable to generate a ciphertext that includes the sum point and an x coordinate of the result of the multiplying of the base point, which is an encryption point; and
      an output unit operable to output the generated ciphertext, and
   wherein the decryption device comprises:
      an acquisition unit operable to acquire the ciphertext from the encryption device; and
      a decryption unit including:
         a square root calculation unit operable to substitute the x coordinate included in the acquired ciphertext into the equation $y^2=x^3+a\times x+b$ to find two solutions y, operable to select one of the two solutions y that is smaller than $(p-1)/2$, and operable to generate a first decryption point, which is made up of the x coordinate included in the acquired ciphertext and the selected solution, as a y coordinate;
         a scalar multiplication unit operable to multiply the first decryption point by a secret key that is a scalar, to generate a second decryption point, the public key point having been generated by multiplying the base point on the elliptic curve by the secret key; and
         a decrypted text calculation unit operable to subtract the second decryption point from the sum point included in the acquired ciphertext, and operable to apply an inverse conversion function, which converts a point on the elliptic curve to a corresponding scalar, to a point obtained as a result of the subtraction by the decrypted text calculation unit, to generate a decrypted text.

2. An encryption device for encrypting a plaintext using an elliptic curve discrete logarithm problem as a basis for security, the encryption device comprising:
   a storage unit storing the plaintext that is a scalar;
   an encryption unit including:
      a random number generation unit operable to generate a random number that is a scalar;
      a first calculation unit operable to multiply a base point on an elliptic curve by the random number, the elliptic curve being defined over a finite field GF(p) by an equation $y^2=x^3+a\times x+b$, where p is a prime;
      a second calculation unit operable to multiply a public key point on the elliptic curve by the random number;
      a conversion unit operable to apply, to the plaintext, a conversion function, which converts a scalar to a corresponding point on the elliptic curve, to generate a plaintext point on the elliptic curve;
      a third calculation unit operable to judge whether a y coordinate of a result of the multiplying of the base point is smaller than $(p-1)/2$, and operable to set, as a sum point, (i) a sum of the plaintext point and a result of the multiplying of the public key point, when the judgment by the third calculation unit is affirmative, and (ii) a corresponding negative point of the sum of the plaintext point and the result of the multiplying of the public key point, when the judgment by the third calculation unit is negative; and
      a generation unit operable to generate a ciphertext that includes the sum point and an x coordinate of the result of the multiplying of the base point, which is an encryption point; and
   an output unit operable to output the generated ciphertext.

3. An encryption device for encrypting a plaintext using an elliptic curve discrete logarithm problem as a basis for security, the encryption device comprising:

a storage unit storing the plaintext that is a scalar;
an encryption unit including:
- a random number generation unit operable to generate a random number that is a scalar;
- a second calculation unit operable to multiply a public key point on an elliptic curve by the random number, the elliptic curve being defined over a finite field GF(p) by an equation $y^2=x^3+a\times x+b$, where p is a prime;
- a conversion unit operable to apply, to the plaintext, a conversion function, which converts a scalar to a corresponding point on the elliptic curve, to generate a plaintext point on the elliptic curve;
- a third calculation unit operable to add the plaintext point and the result of the multiplying of the public key point, to obtain a sum point;
- a first calculation unit operable to judge whether a y coordinate of the sum point is smaller than (p−1)/2, operable to multiply a base point on the elliptic curve by the random number, when the judgment by the first calculation unit is affirmative, and operable to multiply the base point on the elliptic curve by a corresponding negative number of the random number, when the judgment by the first calculation unit is negative; and
- a generation unit operable to generate a ciphertext that includes the result of the multiplying of the base point and includes an x coordinate of the sum point, which is the encryption point; and an output unit operable to output the generated ciphertext.

4. The encryption device of claim 1
wherein the plaintext stored in the storage unit is a content key,
wherein the encryption unit generates the ciphertext by encrypting the content key, and
wherein the encryption device further comprises:
- a content encryption unit operable to encrypt content using the content key; and
- a content output unit operable to output the encrypted content.

5. A decryption device for decrypting a ciphertext using an elliptic curve discrete logarithm problem as a basis for security, an elliptic curve being defined over a finite field GF(p) by an equation $y^2=x^3+a\times x+b$, where p is a prime, the decryption device comprising:
an acquisition unit operable to acquire the ciphertext from an encryption device, the ciphertext including an x coordinate and a sum point, the sum point being set as (i) a sum of a plaintext point on the elliptic curve and a result of multiplying a public key point on the elliptic curve by a random number that is a scalar, when a y coordinate of a result of multiplying a base point on the elliptic curve by the random number is smaller than (p−1)/2, and (ii) a corresponding negative point of the sum of the plaintext point and the result of the multiplying of the public key point, when the y coordinate of the result of the multiplying of the base point on the elliptic curve by the random number is not smaller than (p−1)/2; and
a decryption unit including:
- a square root calculation unit operable to substitute the x coordinate included in the acquired ciphertext into the equation $y^2=x^3+a\times x+b$ to find two solutions y, operable to select one of the two solutions y that is smaller than (p−1)/2, and operable to generate a first decryption point, which is made up of the x coordinate included in the acquired ciphertext and the selected solution, as a y coordinate;
- a scalar multiplication unit operable to multiply the first decryption point by a secret key that is a scalar, to generate a second decryption point, the public key point being generated by multiplying the base point on the elliptic curve by the secret key; and
- a decrypted text calculation unit operable to subtract the second decryption point from the sum point included in the acquired ciphertext, and operable to apply an inverse conversion function, which converts a point on the elliptic curve to a corresponding scalar, to a point obtained as a result of the subtraction by the decrypted text calculation unit, to generate a decrypted text.

6. A decryption device for decrypting a ciphertext using an elliptic curve discrete logarithm problem as a basis for security, an elliptic curve being defined over a finite field GF(p) by an equation $y^2=x^3+a\times x+b$, where p is a prime, the decryption device comprising:
an acquisition unit operable to acquire the ciphertext from an encryption device, the ciphertext including an x coordinate and a result of a multiplication of a base point on the elliptic curve, the result of the multiplication of the base point on the elliptic curve being obtained by (i) multiplying the base point on the elliptic curve by a random number that is a scalar, when a y coordinate of a sum point is smaller than (p−1)/2, and (ii) multiplying the base point on the elliptic curve by a corresponding negative number of the random number, when the y coordinate of the sum point is not smaller than (p−1)/2, the encryption device having obtained the result of the multiplication of the base point; and
a decryption unit including:
- a square root calculation unit operable to substitute the x coordinate included in the acquired ciphertext into the equation $y^2=x^3+a\times x+b$ to find two solutions y, operable to select one of the two solutions y that is smaller than (p−1)/2, and operable to generate a first decryption point, which is made up of the x coordinate included in the acquired ciphertext and the selected solution, as a y coordinate;
- a scalar multiplication unit operable to multiply the result of the multiplying of the base point included in the acquired ciphertext by a secret key that is a scalar, to generate a second decryption point, a public key point being generated by multiplying the base point on the elliptic curve by the secret key; and
- a decrypted text calculation unit operable to subtract the second decryption point from the first decryption point, and apply an inverse conversion function, which converts a point on the elliptic curve to a corresponding scalar, to a point obtained as a result of the subtraction by the decrypted text calculation unit, to generate a decrypted text.

7. The decryption device of claim 5,
wherein the acquisition unit acquires the ciphertext and encrypted content from the encryption device,
wherein the decryption unit decrypts the ciphertext to generate the decrypted text, which is a decrypted content key, and
wherein the decryption device further comprises:
- a content decryption unit operable to decrypt the encrypted content using the decrypted content key to generate decrypted content; and
- content playback unit operable to play back the decrypted content.

8. An encryption method used in an encryption device for encrypting a plaintext that is a scalar using an elliptic curve discrete logarithm problem as a basis for security, the encryption method comprising:

an encryption step of:
generating a random number that is a scalar;
multiplying a base point on an elliptic curve by the random number, the elliptic curve being defined over a finite field GF(p) by an equation $y^2=x^3+a\times x+b$, where p is a prime;
multiplying a public key point on the elliptic curve by the random number;
applying, to the plaintext, a conversion function, which converts a scalar to a corresponding point on the elliptic curve, to generate a plaintext point on the elliptic curve;
judging whether a y coordinate of a result of the multiplying of the base point is smaller than (p−1)/2, and setting, as a sum point, (i) a sum of the plaintext point and a result of the multiplying of the public key point, when the judgment is affirmative, and (ii) a corresponding negative point of the sum of the plaintext point and the result of the multiplying of the public key point, when the judgment is negative; and
generating a ciphertext that includes the sum point and an x coordinate of the result of the multiplying of the base point, which is an encryption point; and
an output step of outputting the generated ciphertext.

9. A non-transitory computer-readable recording medium having a program recorded thereon, the program for use in an encryption device for encrypting a plaintext that is a scalar using an elliptic curve discrete logarithm problem as a basis for security, the program causing a computer to execute a method comprising:

an encryption step of:
generating a random number that is a scalar;
multiplying a base point on an elliptic curve by the random number, the elliptic curve being defined over a finite field GF(p) by an equation $y^2=x^3+a\times x+b$, where p is a prime;
multiplying a public key point on the elliptic curve by the random number;
applying, to the plaintext, a conversion function, which converts a scalar to a corresponding point on the elliptic curve, to generate a plaintext point on the elliptic curve;
judging whether a y coordinate of a result of the multiplying of the base point is smaller than (p−1)/2, and setting, as a sum point, (i) a sum of the plaintext point and a result of the multiplying of the public key point, when the judgment is affirmative, and (ii) a corresponding negative point of the sum of the plaintext point and the result of the multiplying of the public key point, when the judgment is negative; and
generating a ciphertext that includes the sum point and an x coordinate of the result of the multiplying of the base point, which is an encryption point; and
an output step of outputting the generated ciphertext.

10. A decryption method used in a decryption device for decrypting a ciphertext using an elliptic curve discrete logarithm problem as a basis for security, an elliptic curve being defined over a finite field GF(p) by an equation $y^2=x^3+a\times x+b$, where p is a prime, the decryption method comprising:

an acquisition step of acquiring the ciphertext from an encryption device, the ciphertext including an x coordinate and a sum point, the sum point being set as (i) a sum of a plaintext point on the elliptic curve and a result of multiplying a public key point on the elliptic curve by a random number that is a scalar, when a y coordinate of a result of multiplying a base point on the elliptic curve by the random number is smaller than (p−1)/2, and (ii) a corresponding negative point of the sum of the plaintext point and the result of the multiplying of the public key point, when the y coordinate of the result of the multiplying of the base point on the elliptic curve by the random number is not smaller than (p−1)/2; and a decryption step of:
substituting the x coordinate included in the acquired ciphertext into the equation $y^2=x^3+a\times x+b$ to find two solutions y, selecting one of the two solutions y that is smaller than (p−1)/2, and generating a first decryption point, which is made up of the x coordinate included in the acquired ciphertext and the selected solution, as a y coordinate;
multiplying the first decryption point by a secret key that is a scalar, to generate a second decryption point, the public key point being generated by multiplying the base point on the elliptic curve by the secret key; and
subtracting the second decryption point from the sum point included in the acquired ciphertext, and applying an inverse conversion function, which converts a point on the elliptic curve to a corresponding scalar, to a point obtained as a result of the subtraction, to generate a decrypted text.

11. A non-transitory computer-readable recording medium having a program recorded thereon, the program for use in a decryption device for decrypting a ciphertext using an elliptic curve discrete logarithm problem as a basis for security, an elliptic curve being defined over a finite field GF(p) by an equation $y^2=x^3+a\times x+b$, where p is a prime, the program causing a computer to execute a method comprising:

an acquisition step of acquiring the ciphertext from an encryption device, the ciphertext including an x coordinate and a sum point, the sum point being set as (i) a sum of a plaintext point on the elliptic curve and a result of multiplying a public key point on the elliptic curve by a random number that is a scalar, when a y coordinate of a result of multiplying a base point on the elliptic curve by the random number is smaller than (p−1)/2, and (ii) a corresponding negative point of the sum of the plaintext point and the result of the multiplying of the public key point, when they coordinate of the result of the multiplying of the base point on the elliptic curve by the random number is not smaller than (p−1)/2; and a decryption step of:
substituting the x coordinate included in the acquired ciphertext into the equation $y^2=x^3+a\times x+b$ to find two solutions y, selecting one of the two solutions y that is smaller than (p−1)/2, and generating a first decryption point, which is made up of the x coordinate included in the acquired ciphertext and the selected solution, as a y coordinate;
multiplying the first decryption point by a secret key that is a scalar, to generate a second decryption point, the public key point being generated by multiplying a base point on the elliptic curve by the secret key; and
subtracting the second decryption point from the sum point included in the acquired ciphertext, and applying an inverse conversion function, which converts a point on the elliptic curve to a corresponding scalar, to a point obtained as a result of the subtraction, to generate a decrypted text.

* * * * *